(12) United States Patent
Miller et al.

(10) Patent No.: US 12,504,834 B2
(45) Date of Patent: Dec. 23, 2025

(54) EXTENDED-REALITY CONTROLLER FOR PROVIDING DIFFERENT HAPTIC FEEDBACK EVENTS BASED ON POSITIONS AND MAGNITUDES OF USER INPUTS, AND SYSTEMS, DEVICES, AND METHODS OF USE THEREOF

(71) Applicant: Meta Platforms Technologies, LLC, Menlo Park, CA (US)

(72) Inventors: Robin Michael Miller, Redmond, WA (US); Raymond Louis Nicoli, Lake Tapps, WA (US); Chin-Yuan Cheng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/610,146

(22) Filed: Mar. 19, 2024

(65) Prior Publication Data

US 2024/0281073 A1 Aug. 22, 2024

Related U.S. Application Data

(63) Continuation of application No. 17/677,886, filed on Feb. 22, 2022, now Pat. No. 11,934,588.
(Continued)

(51) Int. Cl.
*G06F 3/0338* (2013.01)
*G01L 1/20* (2006.01)
(Continued)

(52) U.S. Cl.
CPC ............. *G06F 3/0338* (2013.01); *G01L 1/20* (2013.01); *G01L 5/22* (2013.01); *G06F 3/016* (2013.01)

(58) Field of Classification Search
None
See application file for complete search history.

(56) References Cited

U.S. PATENT DOCUMENTS

| 5,659,334 A | 8/1997 | Yaniger et al. |
| 6,429,849 B1 * | 8/2002 | An ..................... G06F 3/016 |
| | | 345/161 |

(Continued)

FOREIGN PATENT DOCUMENTS

GB 2517008 A 2/2015

OTHER PUBLICATIONS

Non-Final Office Action mailed Feb. 9, 2023 for U.S. Appl. No. 17/677,886, filed Feb. 22, 2022, 38 pages.
(Continued)

*Primary Examiner* — Kirk W Hermann
(74) *Attorney, Agent, or Firm* — McDermott Will & Schulte LLP

(57) ABSTRACT

A non-transitory computer-readable storage medium is provided that includes instructions that, when executed by a computing device in electronic communication with an extended-reality device controller, cause the computing device to detect, via one or more force sensors of the controller, an input that includes a magnitude of force being applied in a direction generally normal to a plane defined by a portion of a housing of the controller. And the computing device detects a position of the input relative to the plane defined by the portion of the housing. The computing device, based on a determination that the magnitude of force of the input and the position of the input satisfy a positionally-specific predefined force value, causes a haptic feedback to be provided. The haptic feedback is selected from among a set of available haptic feedback events based on both the magnitude of force and the position of the input.

18 Claims, 19 Drawing Sheets

Related U.S. Application Data

(60) Provisional application No. 63/151,783, filed on Feb. 21, 2021.

(51) Int. Cl.
  *G01L 5/22* (2006.01)
  *G06F 3/01* (2006.01)

(56) References Cited

U.S. PATENT DOCUMENTS

| | | | |
|---|---|---|---|
| 6,580,418 | B1 | 6/2003 | Grome et al. |
| 2006/0097453 | A1 | 5/2006 | Feldman et al. |
| 2010/0302017 | A1* | 12/2010 | Guglielmo ............ B66F 11/046 |
| | | | 345/161 |
| 2014/0225832 | A1* | 8/2014 | Wright ................ G06F 3/03543 |
| | | | 345/163 |
| 2015/0376945 | A1 | 12/2015 | Karremann |
| 2017/0001106 | A1* | 1/2017 | Gassoway .............. G05G 9/047 |
| 2017/0144063 | A1 | 5/2017 | Alghooneh et al. |
| 2018/0200617 | A1* | 7/2018 | Tiffany .................. A63F 13/24 |
| 2019/0324539 | A1* | 10/2019 | Wu ......................... G06F 3/016 |
| 2020/0289216 | A1* | 9/2020 | Denlinger .............. A61B 34/37 |
| 2020/0353349 | A1* | 11/2020 | Palmer .................... A63F 13/24 |
| 2020/0356131 | A1 | 11/2020 | O'Neill |
| 2021/0252388 | A1 | 8/2021 | Vanwyk et al. |
| 2021/0286431 | A1* | 9/2021 | Eck .......................... G05G 5/03 |

OTHER PUBLICATIONS

Notice of Allowance mailed Nov. 1, 2023 for U.S. Appl. No. 17/677,886, filed Feb. 22, 2022, 30 pages.

Notice of Allowance mailed Jul. 24, 2023 for U.S. Appl. No. 17/677,886, filed Feb. 22, 2022, 31 pages.

* cited by examiner

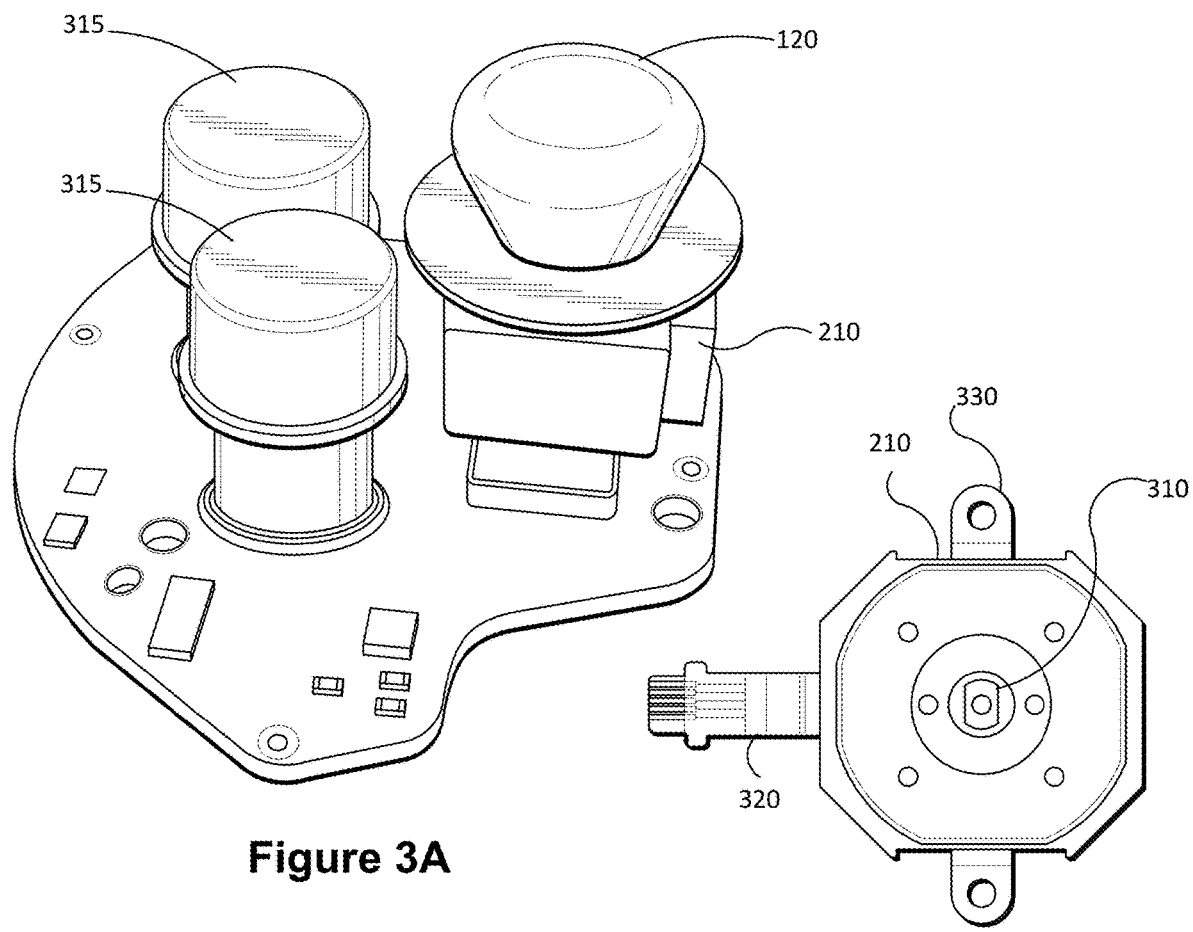
Figure 3A
Figure 3B
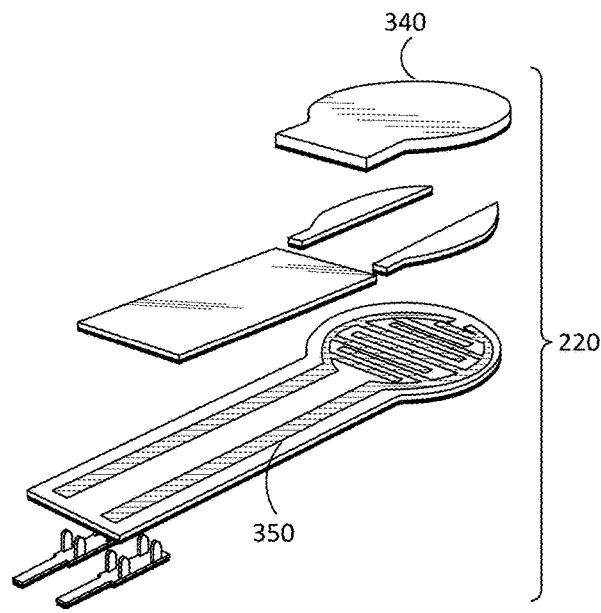
Figure 3C

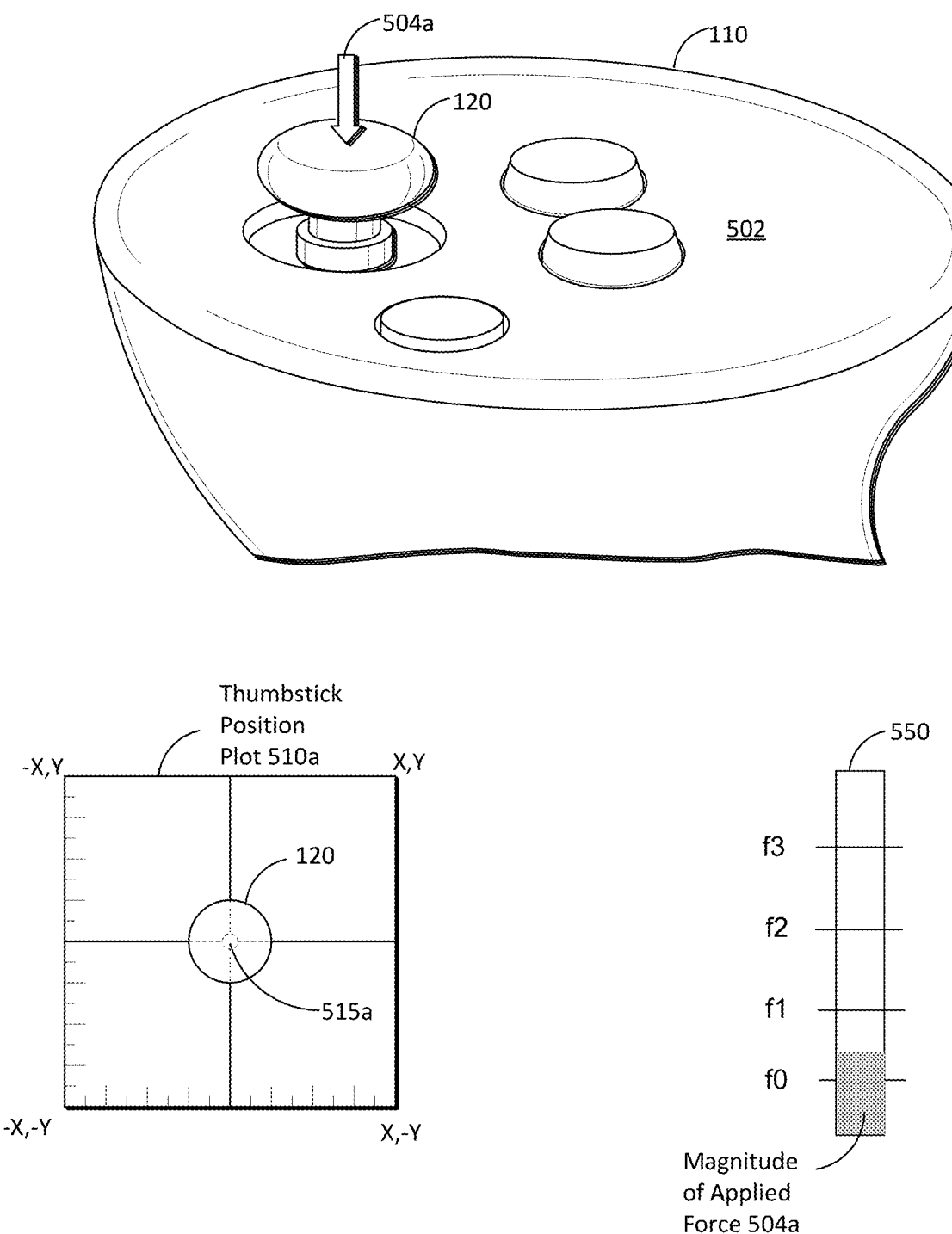
Figure 5A1

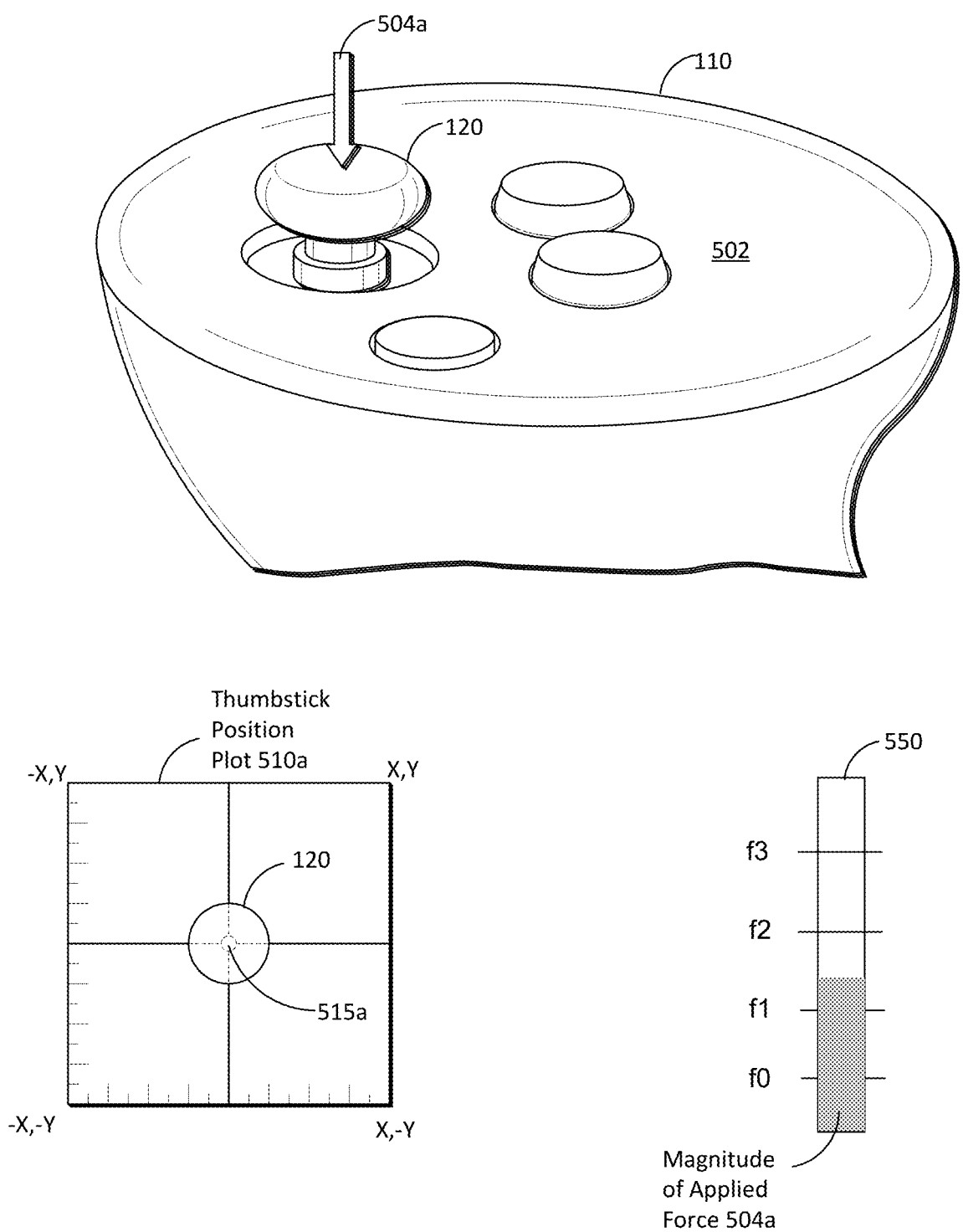
Figure 5A2

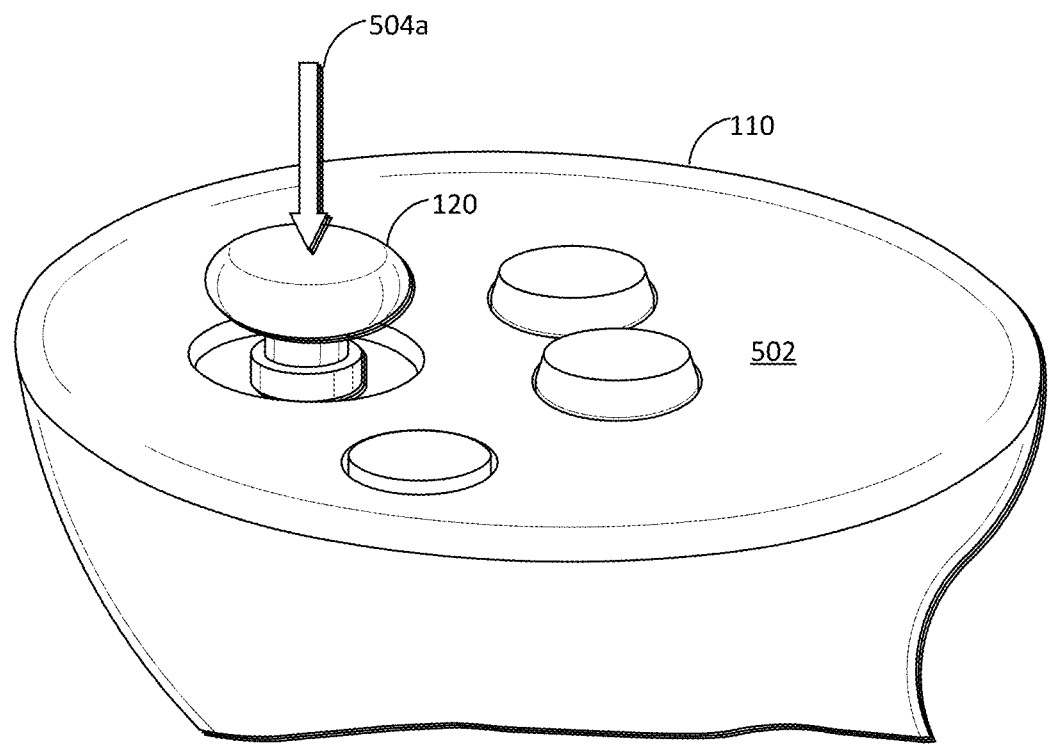
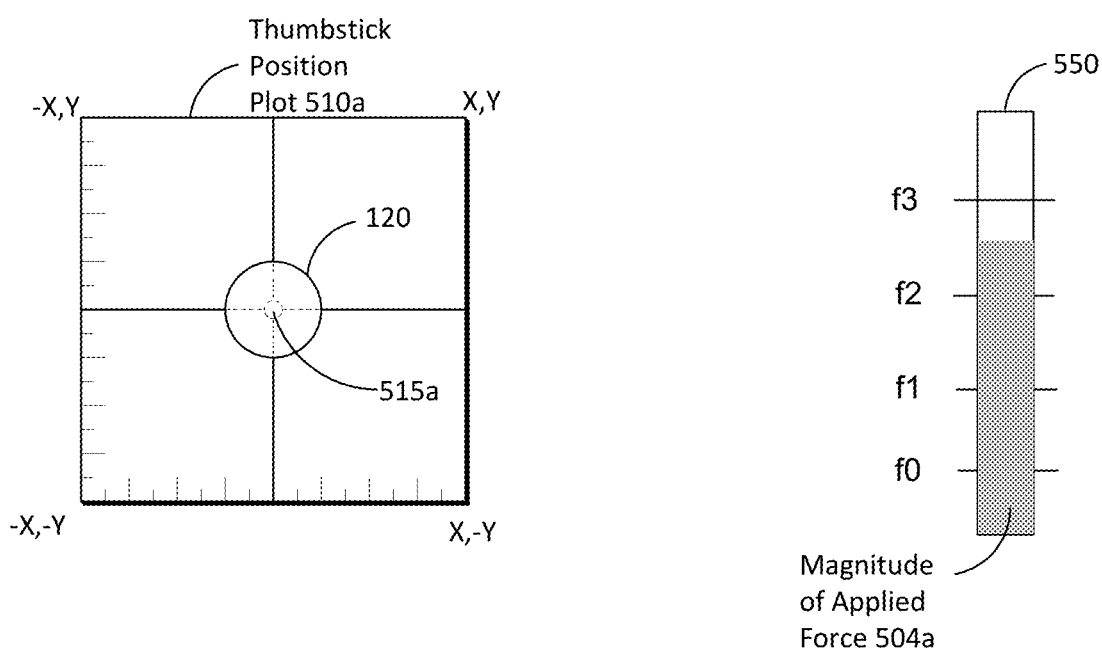
Figure 5A3

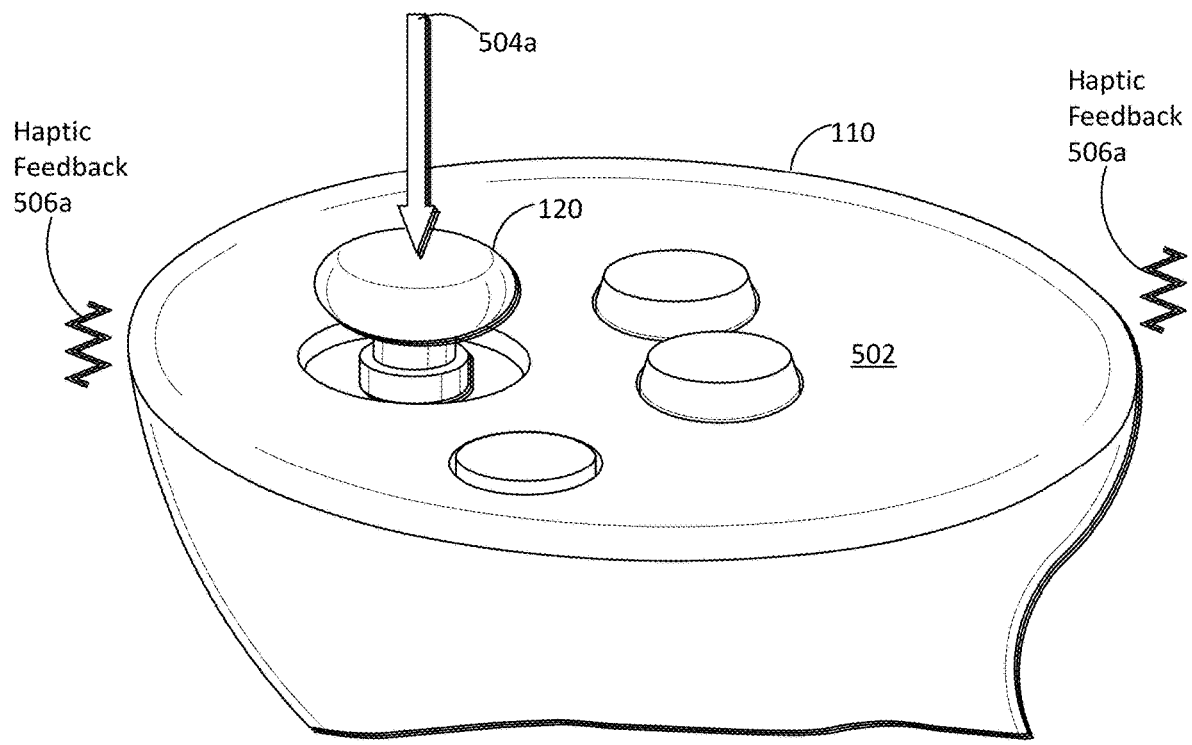
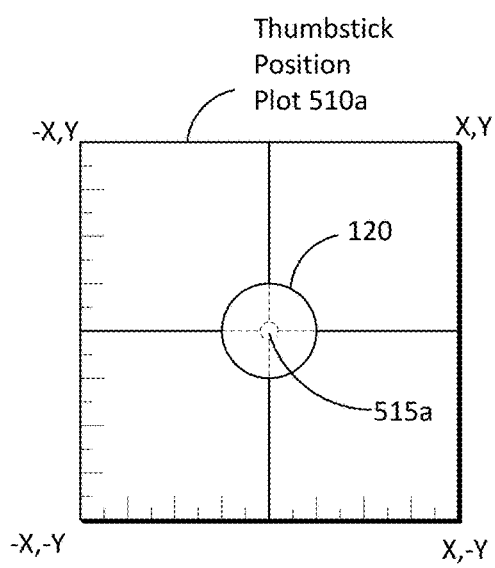 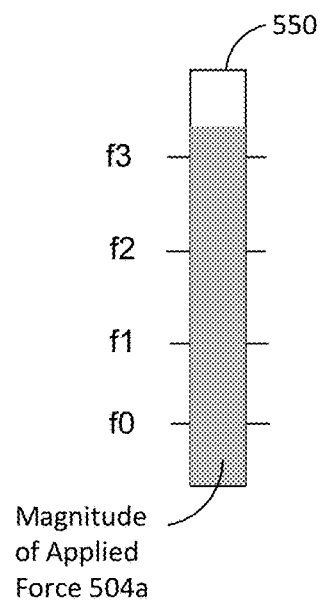
Figure 5A4

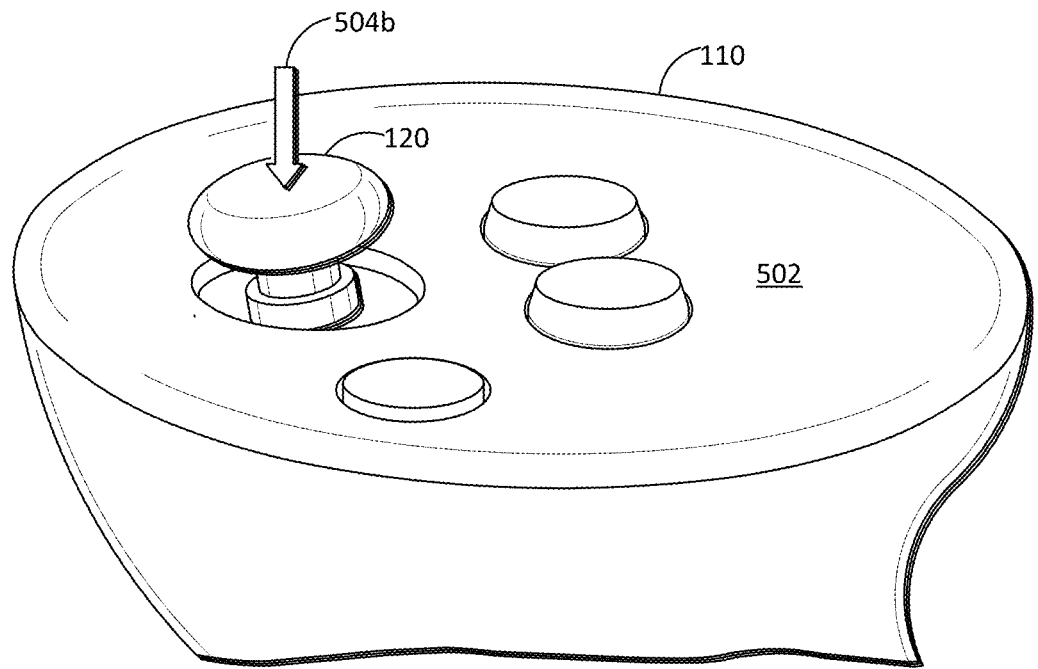
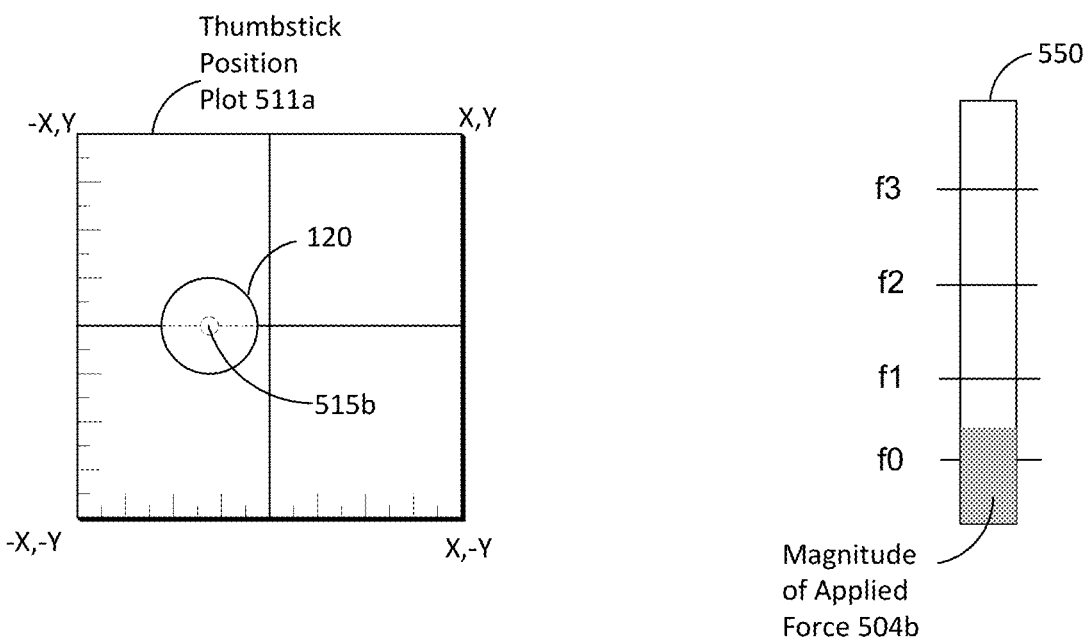
Figure 5B1

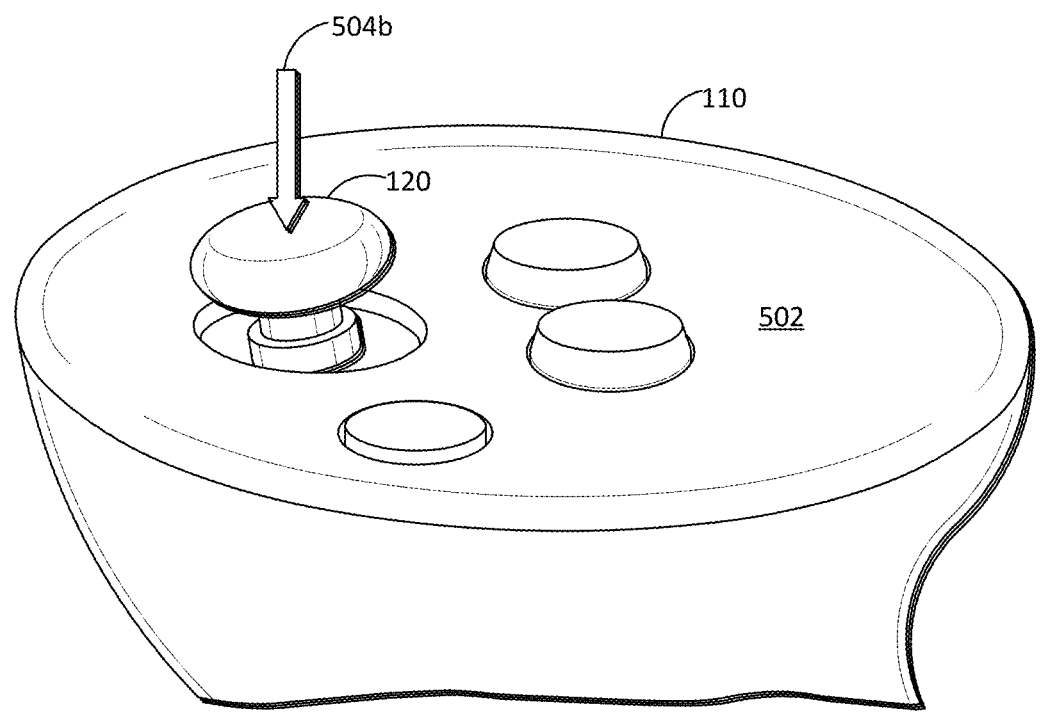
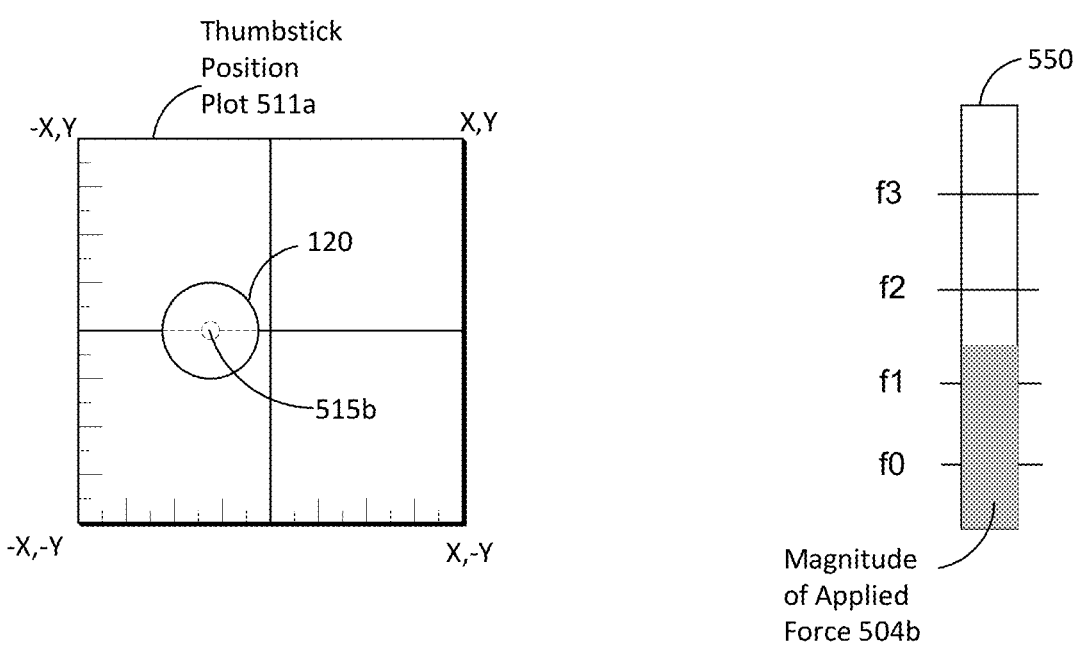
Figure 5B2

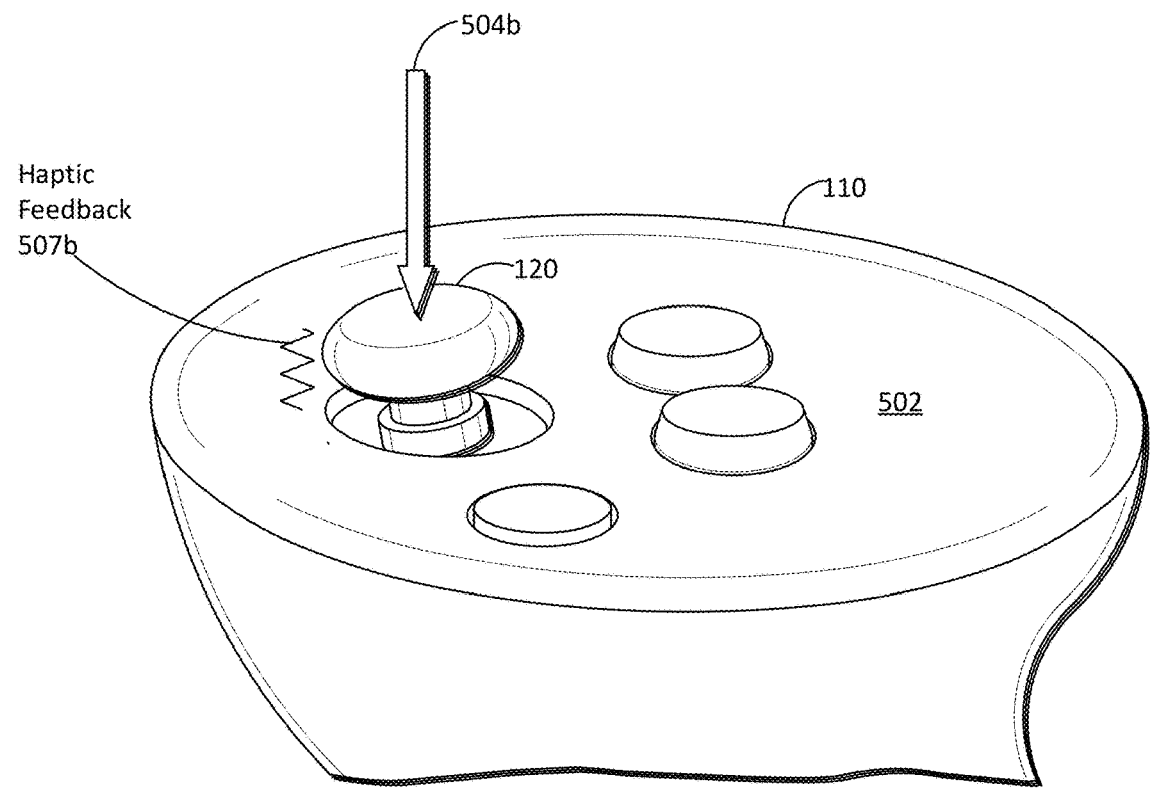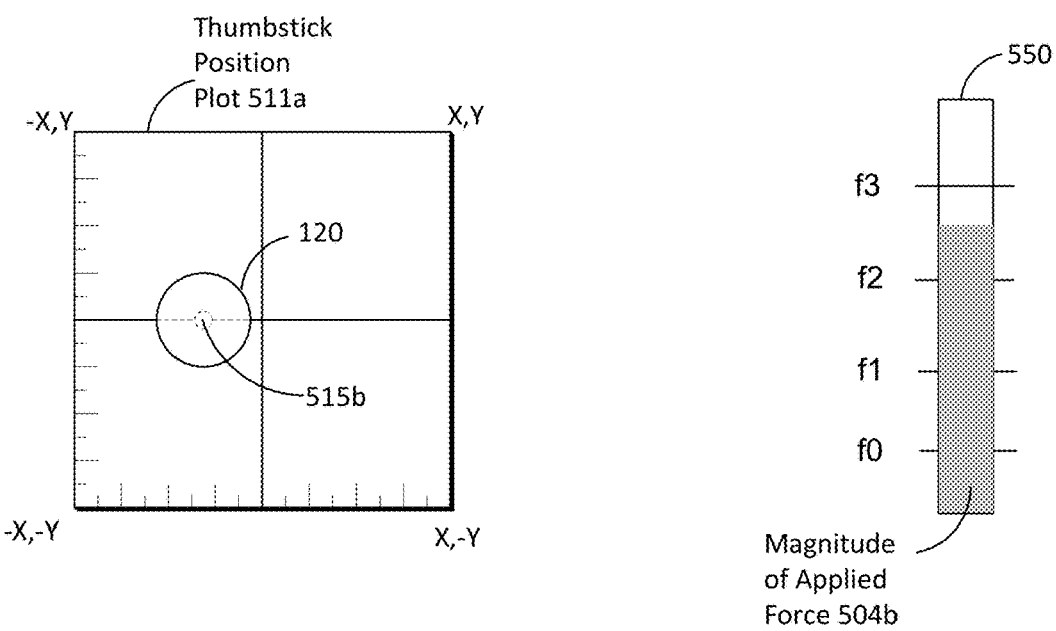
Figure 5B3

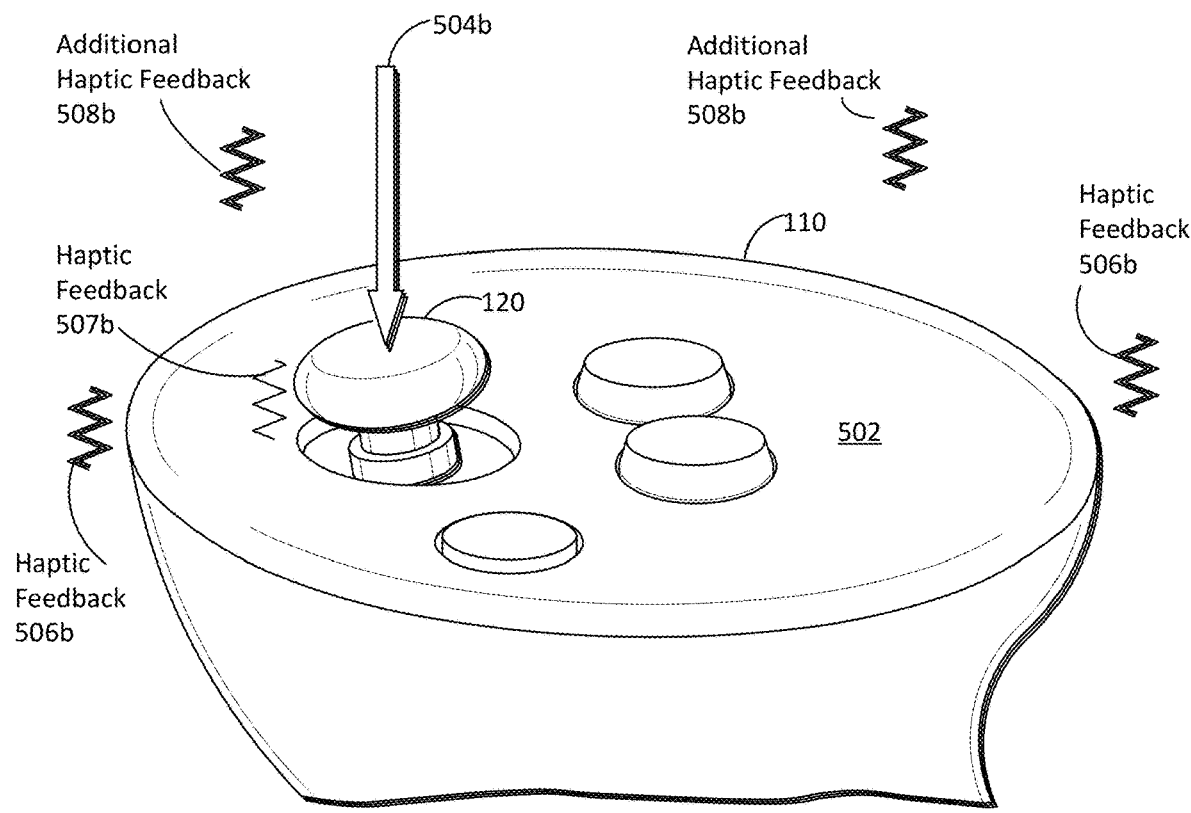
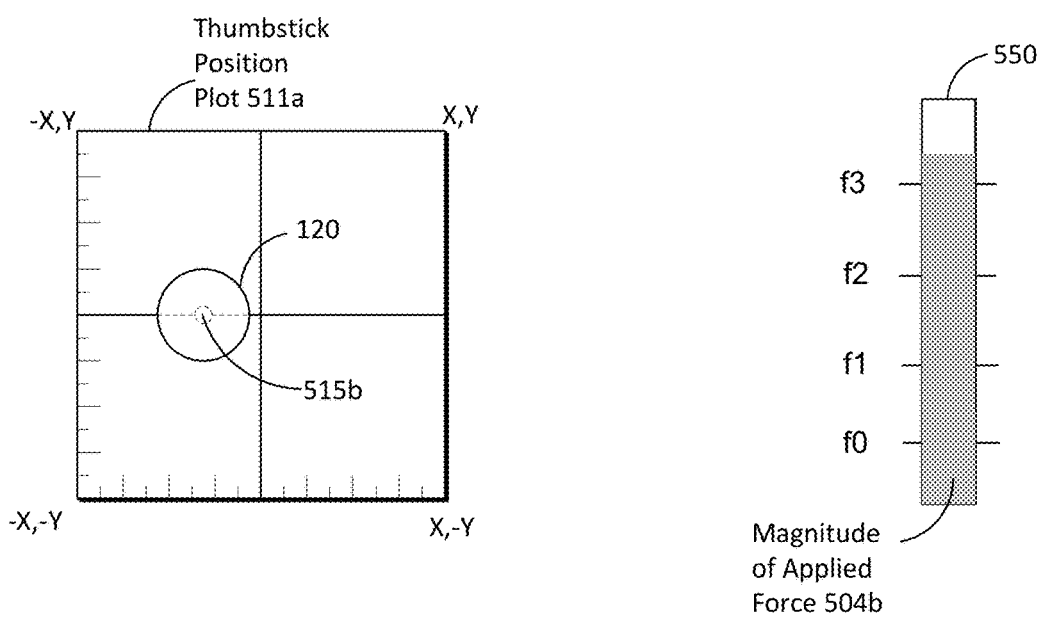
Figure 5B4

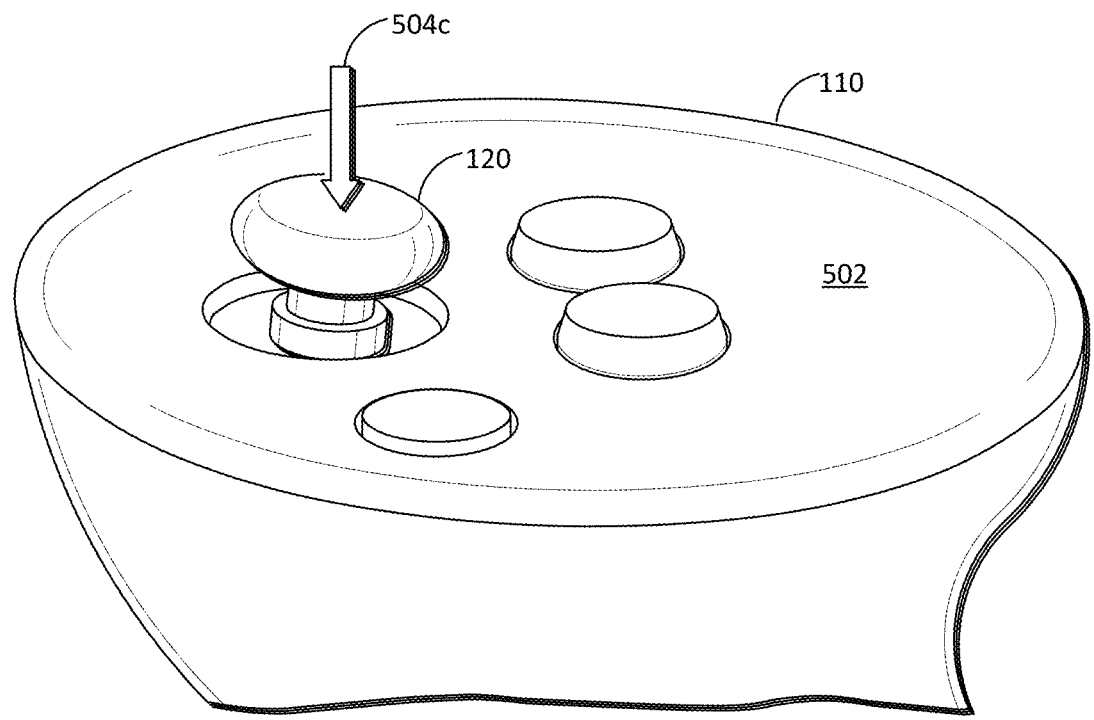
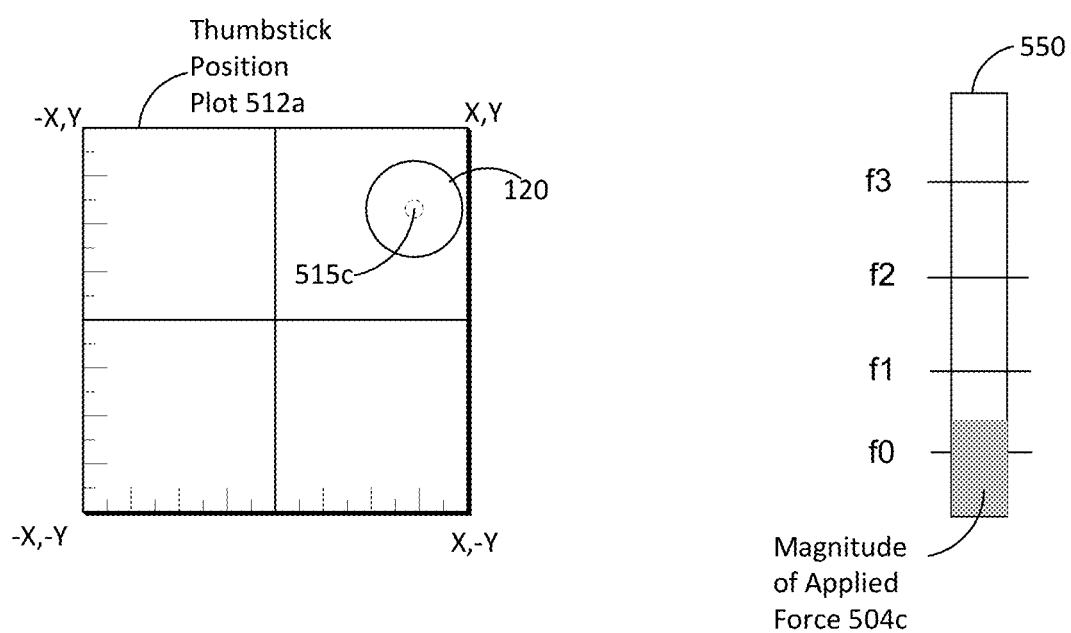
Figure 5C1

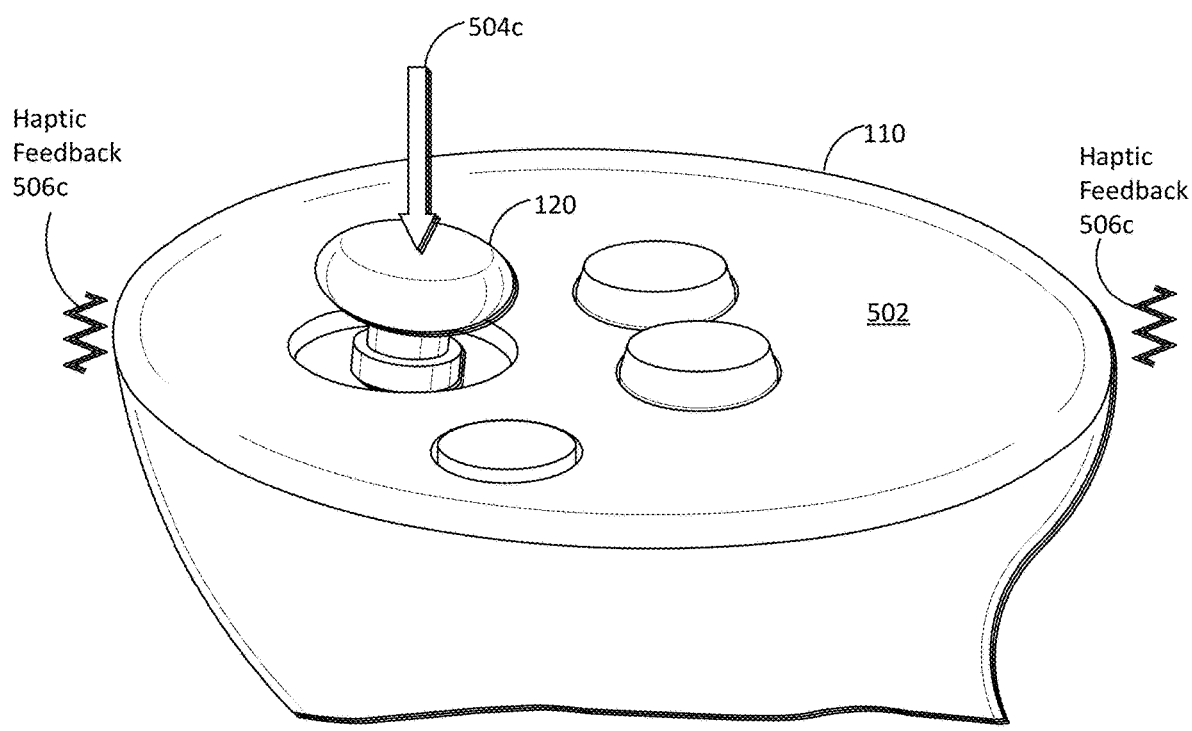
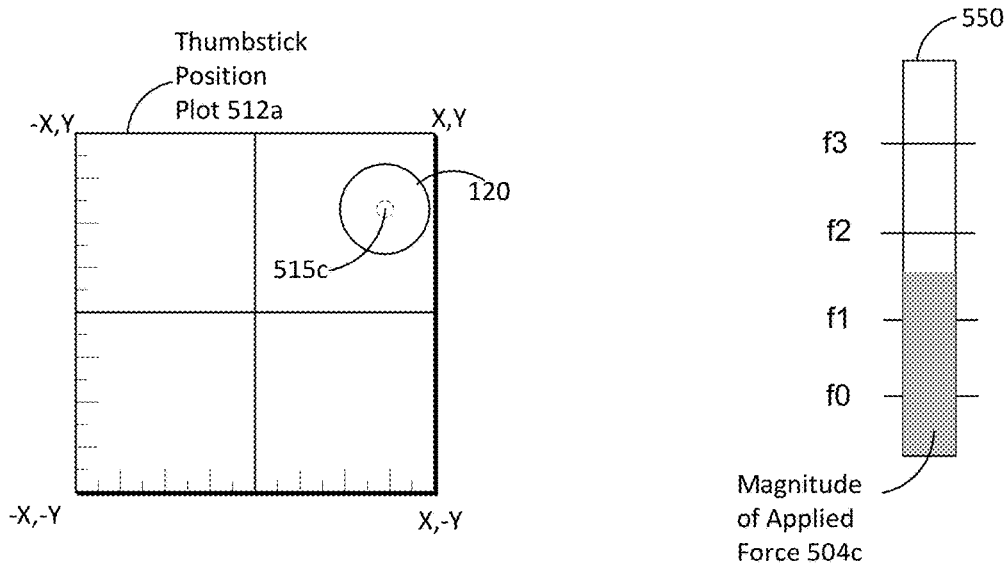
Figure 5C2

EXTENDED-REALITY CONTROLLER FOR PROVIDING DIFFERENT HAPTIC FEEDBACK EVENTS BASED ON POSITIONS AND MAGNITUDES OF USER INPUTS, AND SYSTEMS, DEVICES, AND METHODS OF USE THEREOF

RELATED APPLICATION

This application is a continuation of U.S. patent application Ser. No. 17/677,886, filed on Feb. 22, 2022, entitled "Controller For Sensing Downward Force Applied To A Movable Thumbstick And Providing A Haptic Response Thereto, And Methods Of Use Thereof," which claims priority to U.S. Provisional Patent Application No. 63/151, 783, filed Feb. 21, 2021, entitled "Controller For Sensing Downward Force Applied To A Movable Thumbstick And Providing A Haptic Response Thereto, And Methods Of Use Thereof," which is hereby incorporated by reference in its entirety.

TECHNICAL FIELD

The present disclosure relates generally to controllers with force-sensitive thumbsticks (e.g., used to control actions and objects in artificial-reality environments, including augmented-reality and virtual-reality environments) and, more particularly, to methods of using a controller to sense downward forces applied by a user's thumb to a thumbstick of the controller and providing a haptic response if the applied force exceeds a threshold force value.

BACKGROUND

Some controllers include thumbsticks with associated switches and/or capacitive sensors that are used to recognize one or more inputs provided by the user at the thumbstick, such as a capacitive sensor to recognize an initial contact with the thumbstick to then perform a wakeup function (e.g., present a representation of the controller or the user's hand in an artificial-reality environment) and a switch to recognize a press of the thumbstick in binary fashion (pressed or not pressed). The use of switches and/or capacitive sensors can add increased complexity to a controller's design, which results in increased manufacturing costs. Additionally, the use of switches and/or capacitive sensors can add additional points of failure that can then require a user to seek repairs or purchase replacement parts under certain circumstances. Further, the use of switches and/or capacitive sensors can recognize a limited range of inputs, which can limit the user's ability to define how the controller should respond based on slight changes in the inputs provided and/or to define the feedback that the user receives from the controller in response to the inputs.

As such, it would be desirable to provide controllers and methods of using a controller to sense forces exerted by a user to a thumbstick of the controller (e.g., by directly coupling the thumbstick to a force sensor to create a force-sensing thumbstick) to create a more dynamic and user-friendly controller with a force-sensing thumbstick to address the above-mentioned drawbacks.

SUMMARY

The controller and methods of sensing force applied to a thumbstick described herein make it possible to provide a cost-efficient controller that allows users to interact with artificial-reality environments in new ways (e.g., by providing a number of different force-based inputs at a force-sensing thumbstick of the controller). The controller and methods of sensing force applied to the thumbstick dynamically adapt to the user's movements and provide responsive haptic feedback to the user. More specifically, the controller and methods of sensing forces applied to a thumbstick adjust the force required by the user to produce a user desired response at or within the controllable device. In some embodiments, use of a force sensor with the thumbstick allows for eliminating the need to include a capacitive sensor and/or switch with thumbstick, as the functions performed by these two different components (e.g., allowing for pressing actions on the thumbstick and determining when to perform a wakeup response when a user's thumb initially contacts the thumbstick) can instead be performed using just a force sensor alone (as is explained in more detail below).

In the descriptions that follow, references are made to artificial-reality environments, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), and other types of mixed-reality environments. As the skilled artisan will appreciate upon reading the descriptions provided herein, the novel controller with a force-sensing thumbstick can be used with any of these types of artificial-reality environments.

(A1) In accordance with some embodiments, a method of using a controller with a force-sensing thumbstick to control an artificial-reality environment (e.g., to control objects and actions within the artificial-reality environment) is provided. The method is performed at a controller including (i) a housing configured to house electrical and mechanical components of the controller, (ii) a thumbstick having a stationary default position relative to a top portion of the housing, (iii) one or more force sensors, (iv) one or more processors, and (v) a haptic-feedback generator. The method includes sensing, via the one or more force sensors a magnitude of a first force applied to the thumbstick in a substantially downward direction relative to a top portion of the housing while the thumbstick is in the stationary default position, and a magnitude of a second force applied to the thumbstick in the substantially downward direction relative to the top portion of the housing while the thumbstick is in a position other than the stationary default position (because the thumbstick is movable from the stationary default position to positions other than the stationary default position, the thumbstick can be referred to as a movable thumbstick). The method also includes receiving, by the one or more processors, the magnitude of the first force from the one or more force sensors and the magnitude of the second force from the one or more force sensors, and determining, by the one or more processors, whether the magnitude of the first force or the magnitude of the second force satisfies a predefined force value. The method further includes providing, via the haptic-feedback generator, haptic feedback to the user in response to the one or more processors determining that the magnitude of the first force or the magnitude of the second force satisfies the predefined force value.

(A2) In some embodiments of (A1), the predefined force value is a default-position predefined force value associated with the stationary default position of the thumbstick, the default-position predefined force value being a larger force value than a positionally-specific predefined force value that is associated with the position other than the stationary default position of the thumbstick. The method further includes, before determining whether the magnitude of the first force or the magnitude of the second force satisfies the predefined force value, selecting, by the one or more processors, the default-position predefined force value based on a determination that a current position of the thumbstick relative to the top portion of the housing is the stationary default position. The determining whether the magnitude of the first force or the magnitude of the second force satisfies the predefined force value includes determining that the magnitude of the first force satisfies the default-position predefined force value and the haptic feedback is then provided to the user in response to the one or more processors determining that the magnitude of the first force satisfies the default-position predefined force value.

(A3) In some embodiments of (A2), the magnitude of the first force is sensed at a first point in time that is before a second point in time at which the magnitude of the second force is sensed. The method further includes, after determining that the magnitude of the first force satisfies the default-position predefined force value, selecting, by the one or more processors, the positionally-specific predefined force value based on a determination that the current position of the thumbstick relative to the top portion of the housing is the position other than the stationary default position. Additional haptic feedback is then provided to the user in response to the one or more processors determining that the magnitude of the second force satisfies the positionally-specific predefined force value.

(A4) In some embodiments of any of (A2)-(A3), the positionally-specific predefined force value is a first positionally-specific predefined force value, and the method further includes detecting movement of the thumbstick from the stationary default position and to a second position other than the stationary default position. The second position is further away from the stationary default position than the position. The method further includes selecting, by the one or more processors, a second positionally-specific predefined force value based on the second position of the thumbstick relative to the top portion of the housing. The second positionally-specific predefined force value is a smaller force value than the first positionally-specific predefined force value. The method further includes providing, via the haptic-feedback generator, haptic feedback to the user in response to the one or more processors determining that a magnitude of another force applied to the thumb stick while it is in the second position satisfies the second positionally-specific predefined force value.

(A5) In some embodiments of (A4), the first positionally-specific predefined force value and the second positionally-specific predefined force value are associated with one or more ranges of positions for the thumbstick relative to the top portion of the housing.

(A6) In some embodiments of any of (A2)-(A5), different haptic feedback responses are provided in response to the determinations that force applied to the thumbstick satisfies the default-position predefined force value or the positionally-specific predefined force value.

(A7) In some embodiments of any of (A1)-(A6), the predefined force value is set to avoid false detections of force applied to the thumbstick that is less than a false-detection threshold.

(A8) In some embodiments of any of (A1)-(A7), the predefined force value is a user-specific value that is defined during a training process in which the user applies forces to the thumbstick while it is in the stationary default position.

(A9) In some embodiments of any of (A1)-(A8), the one or more force sensors are positioned within the housing and directly below the thumbstick.

(A10) In some embodiments of any of (A1)-(A9), the one or more force sensors are included in an integrated module that also includes components for sensing a current position of the thumbstick.

(A11) In some embodiments of any of (A1)-(A10), the first and second forces sensed by the one or more force sensors are applied directly to the thumbstick and are not applied to the housing of the controller.

(A12) In some embodiments of any of (A1)-(A11), the thumbstick does not move in the substantially downward direction in response to the first and second forces applied to the thumbstick.

(A13) In some embodiments of any of (A1)-(A12), the controller does not include a mechanical switch that allows for pressing of the thumbstick.

(A14) In some embodiments of any of (A1)-(A13), the thumbstick does not include a capacitive sensor configured to detect that the user's thumb has contacted the thumbstick.

(B1) In accordance with some embodiments, a controller with a force-sensing thumbstick for controlling an artificial-reality environment (e.g., to control objects and actions within the artificial-reality environment) is provided. The controller includes a housing configured to house electrical and mechanical components of the controller. The controller includes a thumbstick having a stationary default position relative to a top portion of the housing. The thumbstick is configured to be moved from the stationary default position by a thumb of a user to cause movement of an object within an artificial-reality environment. The controller includes one or more force sensors configured to sense a magnitude of a first force applied to the thumbstick in a substantially downward direction relative to a top portion of the housing while the thumbstick is in the stationary default position, and a magnitude of a second force applied to the thumbstick in the substantially downward direction relative to the top portion of the housing while the thumbstick is in a position other than the stationary default position. The controller further includes one or more processors configured to receive the magnitude of the first force from the one or more force sensors and the magnitude of the second force from the one or more force sensors, and determine whether the magnitude of the first force or the magnitude of the second force satisfies a predefined force value. The controller includes a haptic-feedback generator configured to provide haptic feedback to the user in response to the one or more processors determining that the magnitude of the first force or the magnitude of the second force satisfies the predefined force value.

(B2) In some embodiments of any of (B1), the controller is configured to perform any of the operations of (A2)-(A14) described below.

(C1) In accordance with some embodiments, a system for controlling objects in an artificial-reality environment (e.g., to control objects and actions within the artificial-reality environment) is provided. The system includes a head-mounted display configured to present the artificial-reality environment including one or more objects to a user that is wearing the wearable device, and the head-mounted display is in communication with a controller having a force-sensitive thumbstick. The system further includes the controller, which controller includes a housing configured to house electrical and mechanical components of the controller, the force-sensitive thumbstick having a stationary default position relative to the housing, one or more force sensors, one or more processors, and a haptic-feedback generator. The controller is configured to sense, via the one or more force sensors, a magnitude of a first force applied to the thumbstick in a substantially downward direction relative to a top portion of the housing while the thumbstick is in the stationary default position, and a magnitude of a second force applied to the thumbstick in the substantially downward direction relative to the top portion of the housing while the thumbstick is in a position other than the stationary default position. The controller is configured to receive, by the one or more processors, the magnitude of the first force from the one or more force sensors and the magnitude of the second force from the one or more force sensors, and determine, by the one or more processors, whether the magnitude of the first force or the magnitude of the second force satisfies a predefined force value. The controller is further configured to provide, via the haptic-feedback generator, haptic feedback to the user in response to the one or more processors determining that the magnitude of the first force or the magnitude of the second force satisfies the predefined force value.

(C2) In some embodiments of any of (C1), the system is configured to perform any of the operations of (A2)-(A14) described below.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIGS. 3A-3C provide close-up views of the thumbstick, its control module, and components of a force sensor that can be integrated with the control module, in accordance with some embodiments.

FIGS. 5A1-5C2 illustrate different use scenarios of the controller including the thumbstick for sensing forces and the haptic feedback provided to a user based on the sensed forces, in accordance with some embodiments.

Figure 1:
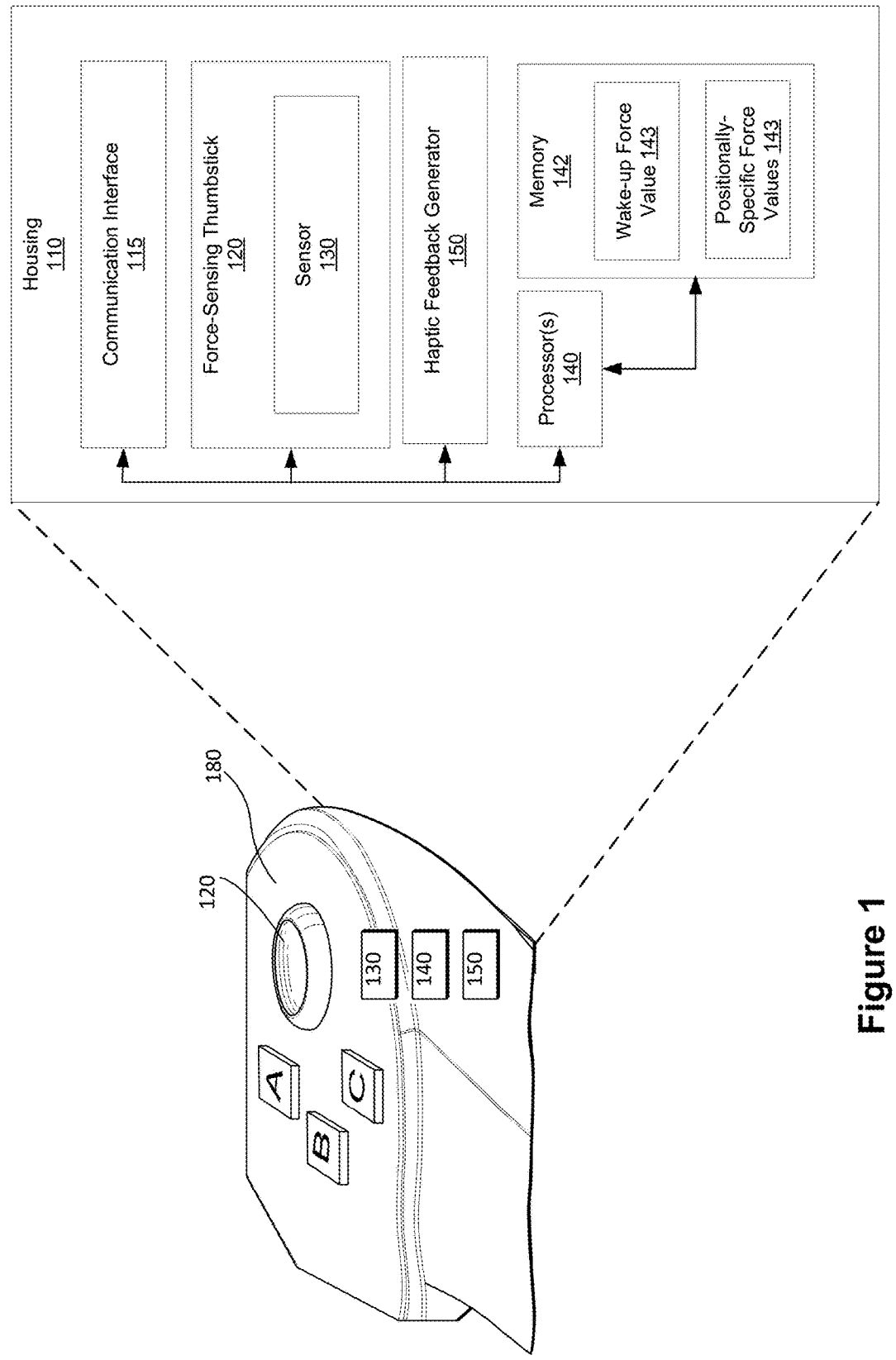
FIG. 1 is an isometric view of a controller including a force-sensing thumbstick and also illustrates components of the controller in a block diagram next to the isometric view, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1 includes an isometric view of a controller including a force-sensing thumbstick and also shows components of the controller in a block diagram next to the isometric view, in accordance with some embodiments. In some embodiments, the controller 100 includes a housing 110 configured to house electrical and mechanical components of the controller 100. In some embodiments, the housing 110 includes one or more of a communication interface 115, one or more thumbsticks 120, one or more sensors 130 (shown in the illustrated example as integrated with the thumbstick, but the sensors 130 in other embodiments can also be mounted underneath the thumbstick), one or more processors 140, and a haptic-feedback generator 150 (each component is discussed in turn below). For simplicity, the descriptions below primarily discuss one controller, which would be held in one of a user's hand (the controller can be operated using one hand), but it should be understood that the descriptions herein also apply to a second controller that would be held by the user's other hand (the second controller can also be operated using one hand), such that the two controllers together allow the user to control actions and objects in an artificial-reality environment. Both controllers can include an instance of the force-sensing thumbstick and the haptic-feedback generator discuss herein. In some embodiments, the force values/thresholds discussed below can be set to the same values for each of the two controllers, but can also be set to different values such that, e.g., when the thumbsticks on the two controllers are in a same position relative to respective top portions of the controllers' housings different magnitudes of force can trigger recognition of a respective force-sensitive input.

In some embodiments, the controller 100 communicatively couples to one or more controllable devices, such as a phone, a head-mounted device (e.g., artificial reality headset or glasses), a tablet, a computer, a console, or any other device capable of presenting or interacting with an artificial-reality environment to allow the control to control actions within the artificial-reality environment, and the controller 100 can also be configured to control devices in the physical world, such as remote control vehicles (e.g., a drone), a vehicle, and/or other similar devices. The controller 100 communicatively couples to one or more controllable devices using the communication interface 115 to establish wired or wireless connections. In some embodiments, the communication interface 115 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

In some embodiments, the controller 100 is configured to provide control instructions (based on user input) to the one or more controllable devices to control or interact with the controllable device. For example, in some embodiments, the controller 100 is configured to provide control instructions (based on user input, such as force-based inputs provided at the thumbstick) to the one or more controllable devices to control or interact with one or more of a virtual avatar, a user interface (and one or more objects within the user interface), and/or any other aspect of an artificial-reality system environment (and one or more objects within the artificial-reality system environment). In another example, the controller 100 can be used to operate a drone, drive a car, control a camera, operate a display, etc.

A thumbstick 120 (which can also be referred to more generally as a control stick) is an input device for generating control instructions at the controller 100 for controlling (or interacting with) the one or more controllable devices. For example, the thumbstick 120 of the controller can be used to control objects in an artificial-reality environment, such as by moving the thumbstick around to different positions to move an avatar or other object around within an artificial-reality environment. In some embodiments, the thumbstick 120 has a stationary default position relative to a top portion 180 of the housing 110 (as shown in FIG. 1, while in the stationary default position, the thumbstick 120 sits in the middle of a hole (hole/cavity 190, FIG. 2) in the top portion 180 through which the thumbstick extends; stated another way, the stem 195 (FIG. 2) is perpendicular to the top portion 180 of the housing while the thumbstick is in its stationary default position). In some embodiments, the thumbstick 120 extends outside of the top portion 180 of the housing of the controller 100 (e.g., extending in a z dimension, which is vertical to the plane of the top portion 180 of the housing 110). The thumbstick 120 is configured to be moved (or tilted) to different positions relative to the top portion of the housing 110. Moreover, the position (or tilt angle) of the thumbstick 120 relative to the top portion of the housing 110 is continuously monitored via the one or more sensors 130 to determine the exact position of the thumbstick 120 within its full range of motion (as discussed in more detail below). References herein to positions of the thumbstick 120 (which, for simplicity, compare thumbstick positions to a top portion 180 of the housing to have a consistent reference point since the thumbstick can move within hole/cavity 190 while the top portion 180 remains in a fixed position). These positional references can also instead refer to a different fixed position point, such as the perimeter of the hole/cavity 190, such that while the thumbstick 120 is in its stationary default position it sits at a distance further away from the perimeter of the hole/cavity 190 as compared to when the thumbstick 120 is moved closer to a part of the perimeter of the hole/cavity 190 (e.g., in FIGS. 5B1-5B4 the thumbstick 120 has been moved closer to a left part of the perimeter of the hole/cavity as compared to the thumbstick distance from the perimeter of the hole/cavity while the thumbstick is in the stationary default position depicted in FIGS. 5A1-5A4; Similarly, in FIGS. 5C1-5C2, the thumbstick 120 is moved closer to a right part of the hole/cavity 190 as compared to the thumbstick distance from the perimeter of the hole/cavity while the thumbstick is in the stationary default position depicted in FIGS. 5A1-5A4).

The thumbstick 120 is configured to move freely in two-dimensions (e.g., x and y dimensions on the same plane as the top portion 180 of the housing 110) and provides two-dimensional input for controlling (or interacting with) the one or more controllable devices. In some embodiments, the thumbstick 120 does not include or use a mechanical switch that allows for pressing of the thumbstick 120 and/or movement in a vertical direction. As such, in some embodiments, the thumbstick 120 is not configured to move in a third dimension (e.g., the z dimension). More specifically, the thumbstick 120 can be configured such that it does not move in the substantially downward direction in response to the user applying a downward force to the thumbstick 120. Although the thumbstick 120 can limit or prevent movement in the third dimension, the thumbstick 120 provides third-dimensional input for controlling (or interacting with) the one or more controllable devices using one or more sensors 130, including one or more force sensors or pressure sensors (such as a force-sensitive resistor (FSR)). In particular, in some embodiments, the one or more sensors 130 sense a force applied to the thumbstick 120 based on application of downward pressure (downward relative to the top portion 180 of the housing) to the thumbstick 120, but the thumbstick 120 is not configured to move in the downward direction in response to application of that downward pressure (stated another way, even though the thumbstick 120 does not physically move, the force sensors of the one or more sensors 130 can be configured to sense the application of downward pressure to the thumbstick 120 to provide information about movement in the third (z) direction/dimension). Further, in some embodiments, the thumbstick 120 does not include or rely on a capacitive sensor to detect that the user's thumb (or any other finger) has contacted the thumbstick 120. Thus, in some embodiments, functions typically performed using two different components (a capacitive sensor and a switch) can be performed using a force sensor instead, thereby reducing the number of components necessary for building the controller, while increasing the available input options (adding input options that are based on a range of forces that can be applied to the thumbstick, as is described in detail below). This allows for a simplified construction (and corresponding reduction in manufacturing costs and failure points) for the controller, while still offering additional input options to users (force-sensitive input options based on force provided at the thumbstick). The one or more sensors 130 are described in detail below.

The thumbstick 120 provides three-dimensional input for controlling (or interacting with) the one or more controllable devices while reducing the number of parts used (e.g., removing the mechanical switch, capacitive sensor, etc.), reducing costs, and simplifying the device (which reduces the number of points of failure and improve accuracy by simplifying the system). It should be noted that, while the thumbstick 120 limits or prevents movement in the third dimension, the thumbstick 120 is not prevented from tilting to desired positions (e.g., tilting to cause the thumbstick's stem 195 to have a different angular relationship (a reduced angle that can be in the range of 89-65 degrees, instead of the default angular relationship of 90 degrees when the thumbstick is in its stationary default position, relative to the top portion 180 of the housing).

As described above, in some embodiments, the one or more sensors 130 are used to continuously monitor the position (and/or tilt angle, which can be directly measured or can be determined based on the measured current position of the thumbstick) of the thumbstick 120 relative to the top portion of the housing 110. In some embodiments, the one or more sensors 130 include one or more FSRs (discussed below in FIG. 2), potentiometers, infrared sensors, magnetometers, proximity sensors, hall sensors, ultrasonic sensors, and/or other position tracking sensors. In some embodiments, the one or more sensors 130 are positioned below the housing 110 below the thumbstick 120. In some embodiments, the one or more sensors 130 are integrated within a control module 210 (FIG. 2) of the thumbstick 120 (as described below in FIG. 2).

The one or more sensors 130, sense (or detect) movement of the thumbstick 120 from the stationary default position to positions other than the stationary default position. The one or more sensors 130, in particular the FSR sensors, are configured to sense a magnitude of a force applied to the thumbstick 120 in a substantially downward direction relative to the top portion of the housing 110 while the thumbstick 120 is in the stationary default position. The one or more sensors 130 are further configured to sense a magnitude of a force applied to the thumbstick 120 in the substantially downward direction relative to the top portion of the housing 110 while the thumbstick 120 is in a position other than the stationary default position. The magnitude of the force sensed by the one or more sensors 130 are applied directly to the thumbstick 120 and are not applied to the housing 110 of the controller 100.

The one or more sensors 130 sense (or detect) the three-dimensional input for controlling (or interacting with) the one or more controllable devices provided by the user via the thumbstick 120, and provides data corresponding to the three-dimensional input to the one or more processors 140 for performing one or more operations as discussed below. In some embodiments, the data includes one or more of a position, a tilt angle, and/or a region of the thumbstick 120 relative to the top portion of the housing 110 while the thumbstick is in the stationary default position.

The one or more processors 140 can be implemented as any kind of computing device, such as an integrated system-on-a-chip, a microcontroller, an FPGA, a microprocessor, and/or other application specific integrated circuits (ASICs). The processor may operate in conjunction with memory 142. The memory 142 may be or include RAM, ROM, DRAM, SRAM and MRAM, and may include firmware, such as static data or fixed instructions, BIOS, system functions, configuration data, and other routines used during the operation of the controller 100 and the processor 140. The memory 142 also provides a storage area for data and instructions associated with applications and data handled by the processor 140. To help allow for the use of force-based inputs at the thumbstick, the memory 142 can also store a number of different predefined force values (which can also be referred to as predefined force thresholds), including a wake-up force value 143 (which can be used to determine when to perform a wake-up function within an artificial-reality environment) and multiple different positionally-specific force values (for determining when a force-based input has been detected at the thumbstick while the thumbstick is in different positions relative to the top portion 180 of the housing 110). Although not shown, in some embodiments, the memory 142 is stored in a remote device (e.g., a controllable device (e.g., a head-mounted display device), a remove computer, or other computer-readable storage medium that is accessible to the one or more processors 140.

In some embodiments, the one or more processors 140 receive data corresponding to the three-dimensional input from the one or more sensors 130 to perform one or more operations. More specifically, the one or more processors 140 receive positional data (i.e., data in the x and y dimensions or the same plane as the top portion 180 of the housing 110) and magnitude data corresponding to forces applied to the thumbstick 120 (i.e., data in the z dimension or in a direction normal to the plane of the top portion 180 of the housing 110). In some embodiments, the one or more processors 140 determine the component (and/or normal) forces applied by the user on the thumbstick 120. More specifically, in some embodiments, the one or more processors 140 receive data including torque forces and/or vector forces (i.e., directional forces), and the one or more processors 140 determine the individual component forces in the x, y, and z dimension and their respective magnitudes. This allows the one or more processors 140 to make faster and more accurate determinations in performing one or more of the operations described below. Alternatively, in some embodiments, the one or more processors 140 use the torque forces and/or vector forces to perform one or more of the operations described below.

In some embodiments, the one or more processors 140 determine whether the magnitude of the force applied the thumbstick 120 satisfies a predefined force value that is stored in the memory 142 (also referred to as predefined force-detection threshold). While the memory 142 and processor(s) 140 are illustrated in FIG. 1 as being part of the controller, the skilled artisan in this field will appreciate upon reading this disclosure that the memory 142 and/or processor(s) 140 can also be external to the controller (e.g., can be associated with a head-mounted display device that is communicatively coupled to the controller). In some embodiments, the predefined force value includes at least a default-position predefined force value (associated with the stationary default position of the thumbstick) and one or more positionally-specific predefined force values that are each equal to or less than the default-position predefined force value. The predefined force values can also include a wake-up force value that is a smaller force value than the other stored force values as it reflects an initial contact with the thumbstick to cause performance of a wake-up action in an artificial-reality environment (wake-up action can include beginning to display a representation of the controller within the artificial-reality environment, which can be configured to occur only in response to a determination that a force application to the thumbstick has exceeded the predefined wake-up force value 143). In some embodiments, the positionally-specific predefined force value(s) are each associated with positions of the thumbstick other than the stationary default position of the thumbstick 120 relative to the top portion 180 of the housing 110. In some embodiments, the predefined force values are additionally or alternatively associated with tilt angles of the thumbstick 120 relative to its 0 degrees of tilt angle while the thumbstick 120 is in the stationary position (as mentioned above, tilt angle of the thumbstick can be measured by the one or more sensors 130 or can be determined based on the thumbstick's current position relative to the top portion 180 of the housing 110). The predefined force values are described in more detail below in reference to FIGS. 5A1-6B.

The default-position predefined force value is associated with a specific position, a tilt angle, and/or a range of positions (including at least the stationary default position of the thumbstick 120 relative to the top portion of the housing 110). Positionally-specific predefined force values can each be associated with a position other than the stationary default position, a tilt angle other than a tilt angle of the thumbstick while it is in the stationary default position, and/or a range of positions for the thumbstick 120 relative to the top portion of the housing 110. In some embodiments, default-position predefined force value and multiple different positionally-specific predefined force values are stored in memory and accessible to the one or more processors 140. In some embodiments, each positionally-specific predefined force value is associated with a unique position, tilt angle, and/or range of positions.

In some embodiments, one or more of the predefined force values are user-specific predefined force values. More specifically, the default-position predefined force value and the positionally-specific predefined force value(s) can be defined during a training process that the user goes through when the user first uses the controller 100, such that for subsequent uses of the controller 100, the predefined force values are then predefined. In some embodiments, predefined force values can be defined for each different user of the controller 100 (e.g., the memory 142, FIG. 1, would then store different user-specific force values, which can be associated with different user profiles). Additionally, in some embodiments, the user defined predefined force values are stored in memory along with factory defined predefined force values such that new users can use the controller 100 without undergoing the training process.

In some embodiments, both user-specific and factory-set thresholds can be used. For instance, the default-position predefined force value and the positionally-specific predefined force values can be user-specific, while the wake-up force value is based on a factory setting that is not user customizable.

In some embodiments, the predefined force value is set to avoid false detections of force applied to the thumbstick 120 that is less than a false-detection threshold (also referred to as predefined false force values). In some embodiments, false detections are referred to as misfires. In some embodiments, the one or more processors 140 are configured to filter or remove false presses (i.e., remove sensed magnitudes that were unintentional or caused by outside forces (e.g., signal interference, finger spasms, etc.). In some embodiments, setting values for the false-detection threshold can also be accomplished during the training process discussed above (e.g., the user can provide feedback to the system during the training process when force-based inputs are erroneously detected by the system, which can then allow the system to determine a user-specific false-detection threshold based on the user's feedback). Similar to the predefined force values, false-detection thresholds can be associated with one or more positions, tilt angles, and/or ranges of positions of the thumbstick 120 relative to the top portion 180 of the housing 110. In some embodiments, the false-detection thresholds are also stored in memory 142 (not shown in FIG. 1 for brevity) and accessible to the one or more processors 140.

In some embodiments, before determining whether the magnitude of the force (provided by the one or more sensors 130) satisfies the predefined force value, the one or more processors 140 select an appropriate predefined force value based on a current position of the thumbstick 120 relative to the top portion of the housing 110. For example, based on a determination that the current position of the thumbstick 120 relative to the top portion of the housing 110 is the stationary default position, the one or more processors 140 select the default-position predefined force value.

In some embodiments, as the thumbstick 120 is moved around to different positions relative to the top portion of the housing 110, the one or more processors 140 are configured to continually and dynamically select the appropriate predefined force values based on the position of the thumbstick 120 relative to the top portion of the housing 110, such that an appropriate predefined force values has been selected before force is then applied to the thumbstick 120. Stated another way, the selection of an appropriate force-detection threshold occurs continuously as the thumbstick is moved around. In some other embodiments, the selection occurs in response to detecting a force-based input at the thumbstick (in other words, a force is first detected at the thumbstick and, in response to detecting that force, the system then uses the current position of the thumbstick to select the appropriate predefined force value to use for recognizing force-based inputs at the thumbstick). As one example, the one or more processors 140 may select a positionally-specific force value associated with a second position of the thumbstick after sensing a force applied to the thumbstick while the thumbstick is in the second position relative to the top portion 180 of the housing 110, and the processor(s) 140 then compare a magnitude of the sensed force value to the selected positionally-specific force value to determine when a force-based input should be recognized and processed (e.g., to cause performance of an action within an artificial-reality environment and to allow for providing of haptic feedback to the use).

As was mentioned above, and the one or more processors 140 select the appropriate predefined force value based on a current position of the thumbstick 120. In some embodiments, the one or more processors 140 select the appropriate predefined force value from among the default-position predefined force value and multiple different positionally-specific predefined force values stored in the memory 142. In some embodiments or circumstances, predefined force values associated with positions of the thumbstick 120 that are further away from the thumbstick 120's stationary default position have a smaller force value (or a range of force values that have a lower-bound that is below a lower-bound) than the other force values associated with positions that are closer to the thumbstick 120's stationary default position. Examples of the different positions associated with predefined force values are illustrated below in FIGS. 4-6B.

The one or more processors 140 provide instructions to the haptic-feedback generator 150 to provide haptic feedback to the user based on a determination that the magnitude of the force satisfies the predefined force value that has been selected based on the thumbstick's current position. As discussed below, one or more haptic feedback responses can be provided to the user based on the determination that the magnitude of the force satisfies the predefined force value. In some embodiments, the one or more processors 140 are configured to determine a rate of change in the magnitude of the force applied to the thumbstick 120. In some embodiments, the rate of change in the magnitude of the force applied to the thumbstick 120 is used to provide instructions to the haptic-feedback generator 150 to provide additional (or different) haptic feedback responses to the user based on the rate of change in the magnitude of the force applied to the thumbstick. In some embodiments, the one or more processors 140 are configured to continuously alter haptic feedback responses being provided to the user based on the rate of change in the magnitude of the force applied to the thumbstick 120 (so long as the magnitude of the force applied to the thumbstick 120 continues to exceed the selected predefined force value).

As one of skill in the art will also appreciate upon reading this disclosure, while examples of specific predefined force values are discussed herein (such that any force value above the specific predefined force value satisfies the threshold), those predefined force values can also be ranges of force values (such that any force value within the relevant range of force values would then satisfy the threshold).

The haptic-feedback generator 150 includes one or more of a speaker, a motor, an LED, a display, a fan, a heating element, and a vacuum. The haptic-feedback generator 150 provides the user with one or more haptic feedback events (also referred to herein as haptic feedback responses) such as one or more of a vibration, a sound, a temperature change, a visual indicator (e.g., inside the controllable device (e.g. an artificial-reality environment) and/or outside controllable device (e.g., visible to the user), a simulated shock, and a pressure). In some embodiments, different haptic feedback events are provided based on which of the predefined force values has been determined to be satisfied. For example, a determination that the default-position predefined force value is satisfied will result in a first haptic feedback being provided to the user, and a determination that a positionally-specific predefined force value is satisfied will result in a second haptic feedback, distinct from the first haptic feedback, being provided to the user. In some embodiments, intensities of the one or more haptic feedback events are based on the magnitude of the force applied to the thumbstick 120 and/or the rate of change in the magnitude of the force applied to the thumbstick 120. Different intensities of the one or more haptic feedback events can include stronger haptic feedback events, haptic feedback events with increased durations, more frequent haptic feedback events, etc.

For instance, a magnitude of a first force that is large (e.g., 150 g or more of force applied in a substantially downward direction to the thumbstick) may result in two or more haptic feedback events (e.g., vibration and sound), whereas a magnitude of a first force that is small (e.g., 75 g or less of force applied in a substantially downward direction to the thumbstick) may result in a single shorter haptic feedback event (e.g., small chirp or short vibration). In another example, a magnitude of a first force that slowly increases until a maximum magnitude is reached may result in a lengthier haptic feedback event that grows stronger (e.g., vibrations that increase in intensity over time), whereas a magnitude of a first force that quickly peaks and is then is no longer applied to the thumbstick (e.g., the user's thumb presses down (e.g., for a period of time that is 150 ms or less) quickly and then is removed from the thumbstick) may result in a single shorter-duration haptic feedback event (e.g., small chirp or short vibration).

In some embodiments, the user defines the haptic feedback provided by the controller 100 based on the predefined force value being satisfied and/or the determined rate of change in the magnitude of the force applied to the thumbstick 120. In some embodiments, the user defines the haptic feedback for each predefined force value (e.g., the default-position predefined force value and the one or more positionally-specific predefined force value) and/or one or more rates of change in the magnitude of the force applied to the thumbstick 120. In some embodiments, the user can define the haptic feedback provided by the controller 100 during the training process described above. The user's haptic feedback preferences can be stored in memory 142 and accessible to the one or more processors 140.

As described above, the haptic-feedback generator 150 provides haptic feedback to the user in response to the one or more processors 140 determining that the magnitude of the force satisfies the predefined force value and/or also determining thereafter that a rate of change in the magnitude of the force applied to the thumbstick 120. In some embodiments, the haptic feedback simulates a physical sensation (e.g., vibration and/or sound) of a click (or down press) of the thumbstick 120. Additionally or alternatively, in some embodiments, the haptic feedback simulates and provides a sensation relative to the action being performed at or within the controllable device. For example, a user interacting with an artificial-reality environment may be provided one or more haptic feedback events to simulate the environment (e.g., varying intensities in vibrations, changes in temperatures, etc.). In another example, a user controlling a vehicle (artificial or real) may be provided one or more haptic feedback events to simulate vibrations the vehicle would experience while driving on a road or other surface, etc.

In addition to the provision of haptic feedback to the user, a determination that force applied to the thumbstick satisfies a selected predefined force value can also result in performance of an action at the controllable device (e.g., a head-mounted display device that is presenting an artificial-reality environment to the user). In other words, in accordance with a determination that a magnitude of force applied to the thumbstick while the thumbstick is in a position other than the stationary default position satisfies a selected predefined force value (e.g., a predefined force value that is selected because the thumbstick is in the position other than the stationary default position) can result in both (i) providing haptic feedback to the user to notify the user that a force-based input at the thumbstick has been detected and (ii) causing performance of an action at the controllable device (e.g., causing an avatar that is moving around the artificial-reality environment to jump). To cause performance of the action at the controllable device, the one or more processors 140 of the controller 100 can be configured to provide an indication to the head-mounted display device that the magnitude of force applied to the thumbstick while the thumbstick is in the position other than the stationary default position has been determined to satisfy the selected predefined force value. The communication interface 115 of the controller 100 can be configured to send the indication to the head-mounted display device. In other embodiments, the controller 100 can instead send the magnitude of the force applied to the thumbstick while the thumbstick is in the position other than the stationary default position to the head-mounted display device, and the head-mounted display device can then perform the determination as to whether the magnitude of the force satisfies a relevant predefined force value (which force value can be selected at the head-mounted display device based on the position other than the stationary default position, or which force value can be selected at the controller 100 and then provided to the head-mounted display device thereafter).

While not shown in FIG. 1, the controller 100 can also include a stylus/pointer that can be attached to a part of the housing 100. In some embodiments, the stylus/pointer can be placed at a bottom part of the housing 100 and the controller can then be flipped around (from holder the controller with the thumbstick 120 facing up to flipping the controller around so the thumbstick 120 is facing downward) in a user's hand to allow for use of the stylus/pointer.

Figure 2:
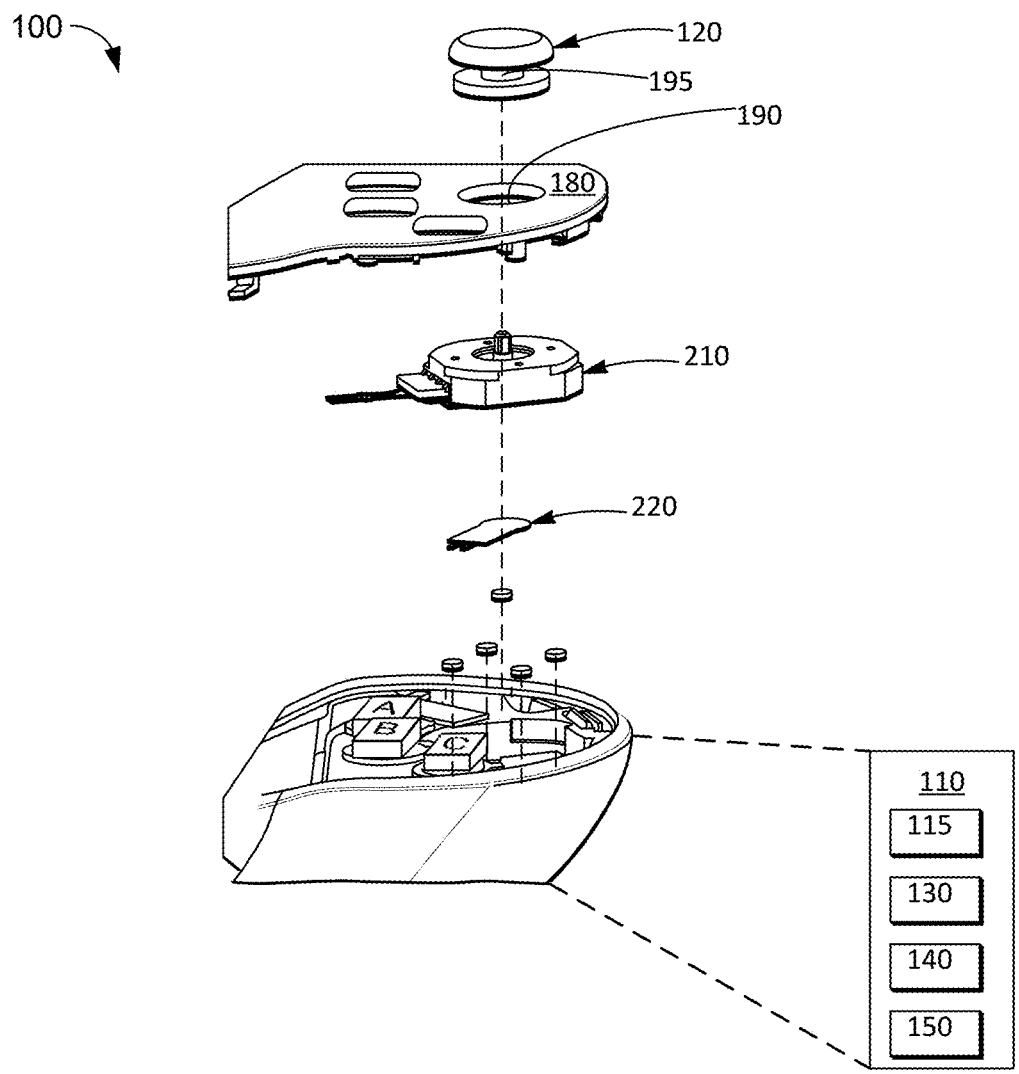
FIG. 2 provides an exploded view of certain components of the controller, in accordance with some embodiments.

FIG. 2 provides an exploded view of the controller 100, in accordance with some embodiments. FIG. 2 illustrates the housing 110 including one or more of a communication interface 115, one or more thumbsticks 120, one or more sensors 130, one or more processors 140, and a haptic-feedback generator 150. FIG. 2 further illustrates a control module 210 and a force sensor 220, which are discussed below.

The control module 210 couples to the thumbstick 120. The control module 210 is configured to allow the thumbstick 120 to move freely in two-dimensions (as described below in FIGS. 5A1-6B). In some embodiments, the control module 210 includes the one or more sensors 130. Additionally or alternatively, in some embodiments, the one or more sensors 130 (or a subset thereof) are positioned below the control module 210 (while remaining communicatively coupled to one another). In some embodiments, the control module 210 in conjunction with the one or more sensors 130 continuously monitor the position (and, under certain circumstances, tilt angle) of the thumbstick 120 relative to the top portion of the housing 110 as was described above in reference to FIG. 1. In some embodiments, the control module 210 interfaces with the one or more processors 140 of the controller 100 (e.g., provides sensor data measured by the one or more sensors 130 to the one or more processors 140). Alternatively, in some embodiments, the control module 210 includes the one or more processors 140 (or a subset thereof) and performs one or more operations described above in FIG. 1.

In some embodiments, the control module 210 is configured to interface with the haptic-feedback generator 150 (FIG. 1) of the controller 100 (e.g., provides instructions for providing haptic feedback to the user). In some embodiments, the control module 210 is configured to work in conjunction with the haptic-feedback generator 150 to provide one or more haptic feedback events to the user via the controller 100. Alternatively or additionally, in some embodiments, the control module 210 is configured to operate with the haptic-feedback generator 150 to provide one or more haptic feedback events to the user via the thumbstick 120 (e.g., one or more haptic feedback events simulating a downward press or click).

The force sensor 220 is a sensor of the one or more sensors 130. The force sensor 220 is configured to sense (or detect) magnitudes of forces applied to the thumbstick 120 (e.g., magnitudes of forces applied in a substantially downward direction as is described more below in reference to FIGS. 5A1-5C2). In some embodiments, the force sensor 220 includes material whose resistance changes when a force, pressure or mechanical stress is applied. In some embodiments, the force sensor 220 includes a of a conductive polymer, which changes resistance in a predictable manner when force is applied to its surface. The force sensor 220 allows for a simple interface between one or more components of the controller 100. In some embodiments, the force sensor 220 is substantially thin (e.g., approximately 0.25 mm thick or less) and substantially flat (e.g., consisting with a flat surface that fits underneath or within the thumbstick 120). In some embodiments, the force sensor 220 is positioned below the control module 210 and also below the thumbstick 120 itself. The force sensor 220 can also be integrated within the control module 210 of the thumbstick 120 (in such embodiments, at least one force sensor 220 is integrated within control module 210, but one or more other force sensors 220 can also remain below and outside of the control module 210).

FIGS. 3A-3C provide different views of the thumbstick 120, the control module 210, and the force sensor 220, in accordance with some embodiments. FIG. 3A shows a portion of a printed circuit board inside the controller 100, which portion of the printed circuit board includes buttons 130, the thumbstick 120, and the control module 210 as a single assembly on the portion of the printed circuit board, in accordance with some embodiments.

FIG. 3B shows a top view of the control module 210, in accordance with some embodiments. The control module 210 includes a coupling member 310 for coupling the control module 210 to a bottom portion of the thumbstick 120 (i.e., the portion of the thumbstick 120 housed within the housing 110). The control module 210 includes an interface member 320 for communicatively coupling to one or more of the one or more sensors 130, the one or more processors 140, and the haptic-feedback generator 150. In some embodiments, the interface member 320 is used to provide data and/or control signals between the one or more components. In some embodiments, control module 210 includes one or more mounts 330 for coupling to the thumbstick assembly show in in FIG. 3A to the controller 100.

FIG. 3C illustrates an exploded view of a force sensor 220. In some embodiments, the force sensor 220 includes one or more of a conductive polymer 340 and a sensing film or trace 350. As described above in FIG. 2, the force sensor 220 is used to detect pressure applied in a substantially downward direction directly to the top of the thumbstick 120. More specifically, as described above in FIG. 2, the force sensor 220 can detect resistance changes when a force, pressure, or mechanical stress is applied to the top of the thumbstick 120. The change in resistance is used to identify a magnitude of the force applied the thumbstick 120.

Figure 4:
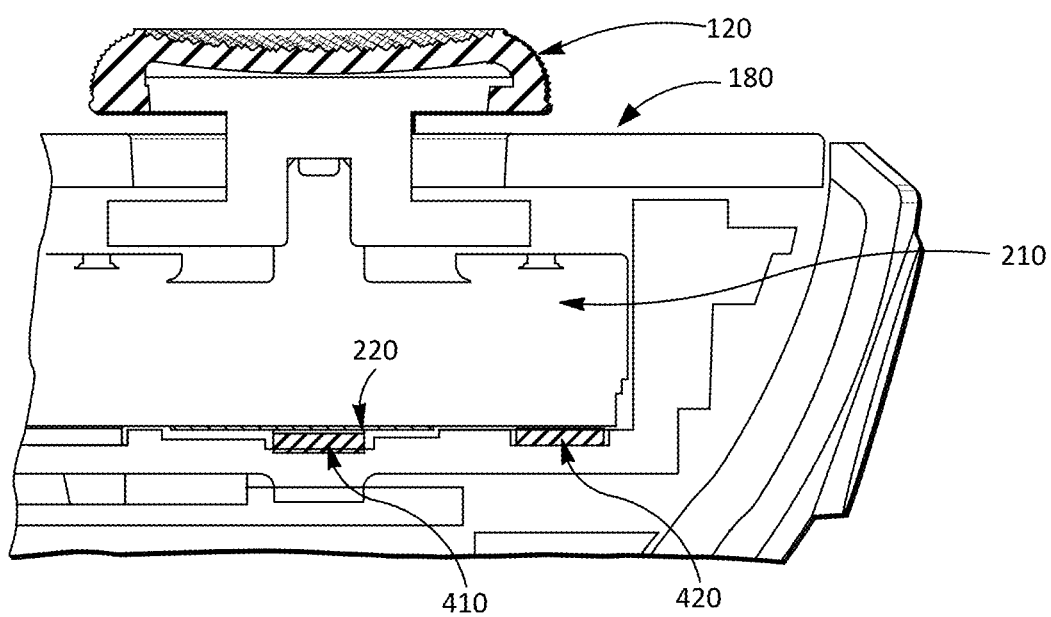
FIG. 4 illustrates a cross-sectional view of the force-sensing thumbstick within the controller 100, in accordance with some embodiments.

FIG. 4 illustrates a cross-sectional view of the thumbstick 120 within the controller 100, accordance with some embodiments. FIG. 4 shows the thumbstick 120, a control module 210, a force sensor 220, a plunger 410 (or rubber pad), and/or one or more springs 420 (or rubber pads). The plunger 410 (or rubber pad), and/or one or more springs 420 (or rubber pads) are used to provide additional stability to the controller. Specifically, the plunger 410 (or rubber pad), and/or one or more springs 420 (or rubber pads) can be configured to limit or reduce to downward movement of the thumbstick 120 when force is applied in the substantially downward direction to the top of the thumbstick 120.

FIGS. 5A1-5C2 illustrate different use scenarios of the controller 100 (FIG. 1) including the thumbstick 120 for sensing forces and the responses provided to a user based on the sensed forces, in accordance with some embodiments. As described above in reference to FIG. 1, the one or more processors 140 determine whether the magnitude of the force (sensed and provided by the one or more sensors 130) satisfies an appropriate predefined force value. In some embodiments, the appropriate predefined force value is selected based on a current position of the thumbstick 120 relative to the top portion 180 of the housing 110 (e.g., substantially planar surface 502). The current positions 515a-515c of the thumbstick 120 relative to the top portion of the housing 110 are shown in the x-y plots 510a-510c (referred to as Thumbstick Position Plots) along with the magnitude of one or more forces 504a-504b (show as the Magnitude of Applied Force diagrams in FIGS. 5A1-5C2) applied to the thumbstick 120 in a substantially downward direction (shown by the direction of the area near applied force 504a in FIG. 5A1) relative to a top portion of the housing 110.

A force value gauge 550 provides a visible representation in FIGS. 5A1-5C2 of the predefined (and positionally-specific) force values (e.g., f0, f1, f2, and f3) that can be defined and that would need to be satisfied to result in recognition of a force-based input at the thumbstick, which would then trigger a response (e.g. haptic feedback and/or performance of an action at the controllable device). As an example, a small predetermined force value f0 can be 50 g or less of force applied in the substantially downward direction at the thumbstick 120, a first medium predetermined force value f1 can be 75 g or less of force applied in the substantially downward direction at the thumbstick 120, a second medium predetermined force value f2 can be 100 g or less of force applied in the substantially downward direction at the thumbstick 120, a large predetermined force value f3 can be 150 g or less of force applied in the substantially downward direction at the thumbstick 120. While the primary examples discussed herein use four predefined force values the skilled artisan in this field will appreciate upon reading this disclosure that that more predetermined force values (e.g., 5, 6, etc.) can be used to more granularly associated the predefined force values with various positions of the thumbstick 120. Similarly, the respective values of the predetermined force values can be adjusted by the user or based on the specific implementation. And, while the gauge 550 shows the predefined force values as corresponding to a particular force value (e.g., a discrete force value), it is also within the scope of this disclosure to uses ranges of force values instead (e.g., f0 can be a range of force values between 45-60 g of force applied in the substantially downward direction at the thumbstick 120).

FIGS. 5A1-5A4 show a magnitude of a first force 504a applied to the thumbstick 120 in a substantially downward direction relative to a top portion of the housing 110 while the thumbstick 120 is in the stationary default position (as shown by a first current position 515a, which is centered on the first grid 510a). As shown in the sequence of figures, first force 504a increases over time (as illustrated visually by the lengthening of the arrow that is beneath the reference numeral 504a in the sequence in FIGS. 5A1-5A4). The various depicted magnitudes of first force 504a can correspond to a single force input 504a that increases over a short period of time, or can correspond to four different force inputs 504a, each having a different magnitude of force applied in the substantially downward direction at the thumbstick 120.

The one or more processors 140 receive the magnitude of the first force 504a from the one or more force sensors 130, and determine whether the magnitude of the first force 504a satisfies a predefined force value. In some embodiments, before determining whether the magnitude of the first force 504a satisfies the predefined force value, the one or more processors 140 select one of (i) the default-position predefined force value (which is associated with the stationary default position of the thumbstick 120) or (ii) one of the positionally-specific predefined force values (which are each associated with positions other than the stationary default position of the thumbstick 120, as is discussed in more detail below regarding FIGS. 6A-6B), based on a current position 515a of the thumbstick 120 relative to the top portion of the housing 110 (as described above in FIG. 1). In the example of FIGS. 5A1-5A4, the one or more processors 140 select the default-position predefined force value based on a determination that the current position 515a of the thumbstick 120 relative to the top portion of the housing 110 is the stationary default position (thumbstick position plot 510a also shows that the thumbstick 120 remains at its stationary default position while the force 504a is applied to the thumbstick 120).

The default-position predefined force value, for purposes of example FIGS. 5A1-5A4, is the large, predetermined force value f3. As noted in FIG. 1, positions of the thumbstick 120 that are further away from the thumbstick 120's stationary default position can have a smaller predefined force value (or a range of force values that have a lower-bound that is below a lower-bound) than the other force-detection thresholds associated with positions that are closer to the thumbstick 120's stationary default position.

The haptic-feedback generator 150 provides one or more haptic feedback events to the user in response to the one or more processors 140 determining that the magnitude of the first force 504a satisfies the default-position predefined force value, which occurs once the magnitude of first force 504a satisfies the predefine force value f3 in FIG. 5A4. As shown in FIG. 5A1, the magnitude of the first force 504a satisfies the small, predetermined force value f0, but fails to satisfy the large, predetermined force value f3 and therefore a force-based input event is not recognized at that time and no haptic feedback is provided to the user (nor is an action in response to recognition of the force-based input event performed at the controllable device). Similarly, in FIGS. 5A2 and 5A3, the magnitude of the first force 504a grows and satisfies first medium predetermined force value f1 and the second medium predetermined force value f2, but fails to satisfy the large, predetermined force value f3 and therefore a force-based input event is again not recognized at those times and no haptic feedback is provided to the user (nor is an action in response to recognition of the force-based input event performed at the controllable device). It is not until the magnitude of the first force 504a is large enough to satisfy the large predetermined force value f3 (as shown in FIG. 5A4) that a haptic feedback event 506a (e.g., a vibration) is provided to the user, which is shown in FIG. 5A4 (in conjunction with providing the haptic feedback event 506a, data regarding recognition of the force-based input event can also be provided to the controllable device (e.g., a head-mounted display device) to cause performance of an action at the controllable device (e.g., causing an avatar to jump within an artificial-reality environment provided by the head-mounted display device).

Force-based input events can also be recognized while the thumbstick is in positions other than the stationary default position. Recognition of these force-based input events while the thumbstick is in positions other than the stationary default position can cause provision of a different type of haptic feedback (relative to that provided in response to recognition of a force-based input even while the thumbstick is in the stationary default position) and/or causing performance of different actions at the controllable device, such as the head-mounted display device discussed above. Examples of recognizing other force-based input events while the thumbstick is in positions other than the stationary default position are shown in FIGS. 5B1-5C2. For example, FIGS. 5B1-5B4 show a magnitude of a second force 504b applied to the thumbstick 120 in the substantially downward direction relative to a top portion of the housing 110 (illustrated by the direction of the arrow for applied force 504b) while the thumbstick 120 is in a position other than the stationary default position (second current position 515b is distinct from stationary default position 515a, as the thumbstick position plot 510b shows that the thumbstick 120 has been moved to the left relative to the thumbstick's stationary default position). As shown in the sequence of figures, second force 504b increases over time (as illustrated visually by the lengthening of the arrow that is beneath the reference numeral 504b in the sequence in FIGS. 5B1-5B4). The various depicted magnitudes of second force 504b can correspond to a single force input 504b that increases over a short period of time, or can correspond to four different force inputs 504b, each having a different magnitude of force applied in the substantially downward direction at the thumbstick 120.

The one or more processors 140 receive the magnitude of the second force 504b from the one or more force sensors 130, and determine whether the magnitude of the second force 504b satisfies a predefined force value. As described above, before determining whether the magnitude of the second force 504b satisfies the predefined force value, the one or more processors 140 select one of (i) the default-position predefined force value or (ii) one of the positionally-specific predefined force values, based on the second current position 515b of the thumbstick 120 relative to the top portion of the housing 110. In the example of FIGS. 5B1-5B4, the one or more processors 140 select a first positionally-specific predefined force value based on a determination that the second current position 515b of the thumbstick 120 relative to the top portion of the housing 110 is to the left of the stationary default position (e.g., approximately 2 mm to the left of the stationary default position). The first positionally-specific predefined force value, for purposes of example FIGS. 5B1-5B4, is the second predetermined force value f2.

The haptic-feedback generator 150 provides one or more haptic feedback events to the user in response to the one or more processors 140 determining that the magnitude of the second force 504b satisfies the first positionally-specific predefined force value, which occurs once the magnitude of second force 504b satisfies the second medium predetermined force value f2 in FIG. 5B3. As shown in FIG. 5B1, the magnitude of the second force 504b satisfies the small, predetermined force value f0, but fails to satisfy the second medium predetermined force value f2 and, therefore, a force-based input event is not recognized at that times and no haptic feedback is provided to the user (nor is an action in response to recognition of the force-based input event performed at the controllable device). Similarly, in FIG. 5B2, the magnitude of the second force 504b grows and satisfies first medium predetermined force value f1, but fails to satisfy the second medium predetermined force value f2 and, therefore, a force-based input event is again not recognized at that time and no haptic feedback is provided to the user (nor is an action in response to recognition of the force-based input event performed at the controllable device). It is not until the magnitude of the second force 504b is large enough to satisfy the second medium predetermined force value f2 (as shown in FIG. 5B3) that a haptic feedback event 507a (e.g., a vibration at or near the thumbstick 120) is provided to the user. As shown in FIG. 5B3, haptic feedback of different types can be provided in response to determinations that the force values have been satisfied, with FIG. 5B3 shown a haptic feedback provided directly at the thumbstick 120 (as compared to FIG. 5A4 which showed an example haptic feedback provided at the body/housing of the controller instead of directly at the thumbstick 120). When the first positionally-specific predefined first value is determined to have been satisfied by the magnitude of force 504b (as shown in FIG. 5B3, then in conjunction with providing the haptic feedback event 507b, data regarding recognition of the force-based input event can also be provided to the controllable device (e.g., a head-mounted display device) to cause performance of an action at the controllable device (e.g., which can be a different action than that which is caused to be performed after recognition of the force-based input event of FIG. 5A4).

As discussed above in FIG. 1, in some embodiments, a predefined force value is associated with different haptic feedbacks intensities and/or or more haptic feedbacks. In some embodiments, the haptic feedback event changes based on the magnitude of the force. For example, as shown in FIG. 5B4, the magnitude of the second force 504b (while the second current position 515b and the first positionally-specific predefined force value is selected) grows and then satisfies the large, predetermined force value f3 resulting in additional haptic feedback events 506b and 508b being provided to the user, in addition to haptic feedback event 507b. In this way, the controller 100 is configured to alert the user that different force-based input events have been recognized as a magnitude of force applied to the thumbstick 120 changes. Thus, the user is able to perform different discrete actions at the controllable device by changing how much force is applied to the thumbstick 120 while the thumbstick 120 is in different positions.

FIGS. 5C1-5C2 show a magnitude of a third force 504c applied to the thumbstick 120 in a substantially downward direction relative to a top portion of the housing 110 while the thumbstick 120 is in a position other than the stationary default position (third current position 515c is distinct from stationary default position 515a, as the thumbstick position plot 510c shows that the thumbstick 120 has been moved to the upper right relative to the thumbstick's stationary default position). As shown in the sequence of figures, third force 504c increases over time (as illustrated visually by the lengthening of the arrow that is beneath the reference numeral 504c in the sequence in FIGS. 5C1-5C2). The various depicted magnitudes of third force 504c can correspond to a single force input 504c that increases over a short period of time, or can correspond to two different force inputs 504c, each having a different magnitude of force applied in the substantially downward direction at the thumbstick 120.

The one or more processors 140 receive the magnitude of the third force 504c from the one or more force sensors 130, and determine whether the magnitude of the third force 504c satisfies a predefined force value. As described above, before determining whether the magnitude of the third force 504c satisfies the predefined force value, the one or more processors 140 select one of (i) the default-position predefined force value or (ii) one of the positionally-specific predefined force values, based on the third current position 515c of the thumbstick 120 relative to the top portion of the housing 110. In the example of FIGS. 5C1-5C2, the one or more processors 140 select a second positionally-specific predefined force value based on a determination that the third current position 515c of the thumbstick 120 relative to the top portion of the housing 110 is to the upper right of the stationary default position (e.g., approximately 5 mm up and 5 mm to the right of the stationary default position). The second positionally-specific predefined force value, for purposes of example FIGS. 5C1-5C2, is the first predetermined force value f1.

The haptic-feedback generator 150 provides one or more haptic feedback events to the user in response to the one or more processors 140 determining that the magnitude of the third force 504c satisfies the second positionally-specific predefined force value, which occurs once the magnitude of third force 504b satisfies the first medium predetermined force value f1 in FIG. 5C2. As shown in FIG. 5C1, the magnitude of the third force 504c satisfies the small, predetermined force value f0, but fails to satisfy the first medium predetermined force value f1 and, therefore, a force-based input event is not recognized at that times and no haptic feedback is provided to the user (nor is an action in response to recognition of the force-based input event performed at the controllable device). It is not until the magnitude of the third force 504c is large enough to satisfy the first medium predetermined force value f1 (as shown in FIG. 5C2) that a haptic feedback event 506c (e.g., a vibration) is provided to the user, which is shown in FIG. 5C2 (in conjunction with providing the haptic feedback event 506c, data regarding recognition of the force-based input event can also be provided to the controllable device (e.g., a head-mounted display device) to cause performance of an action at the controllable device (e.g., causing an avatar to jump within an artificial-reality environment provided by the head-mounted display device).

As described above, in some embodiments or circumstances, positionally-specific predefined force values are associated with different positions of the thumbstick 120 as compared to the thumbstick 120's stationary default position. As such, the selection of the first positionally-specific predefined force value or the second positionally-specific predefined force value is based on the position and/or tilt angle associated with the first positionally-specific predefined force value and the second positionally-specific predefined force value. For example, after detecting a force applied to the thumbstick 120 (e.g., force 504a in FIG. 5A1), an appropriate predefined force value is selected for use in determining whether to recognize any force-based input events. In some embodiments, this selection of an appropriate force value occurs continually as the thumbstick is moved around to ensure that the force-based input events are accurately recognized based on current positions of the thumbstick 120 This allows the controller 100 continually and/or dynamically select an appropriate predefined force value based on the position of the thumbstick 120 before a force sufficient to cause recognition of a force-based input event is then applied to the thumbstick 120.

Figure 6A:
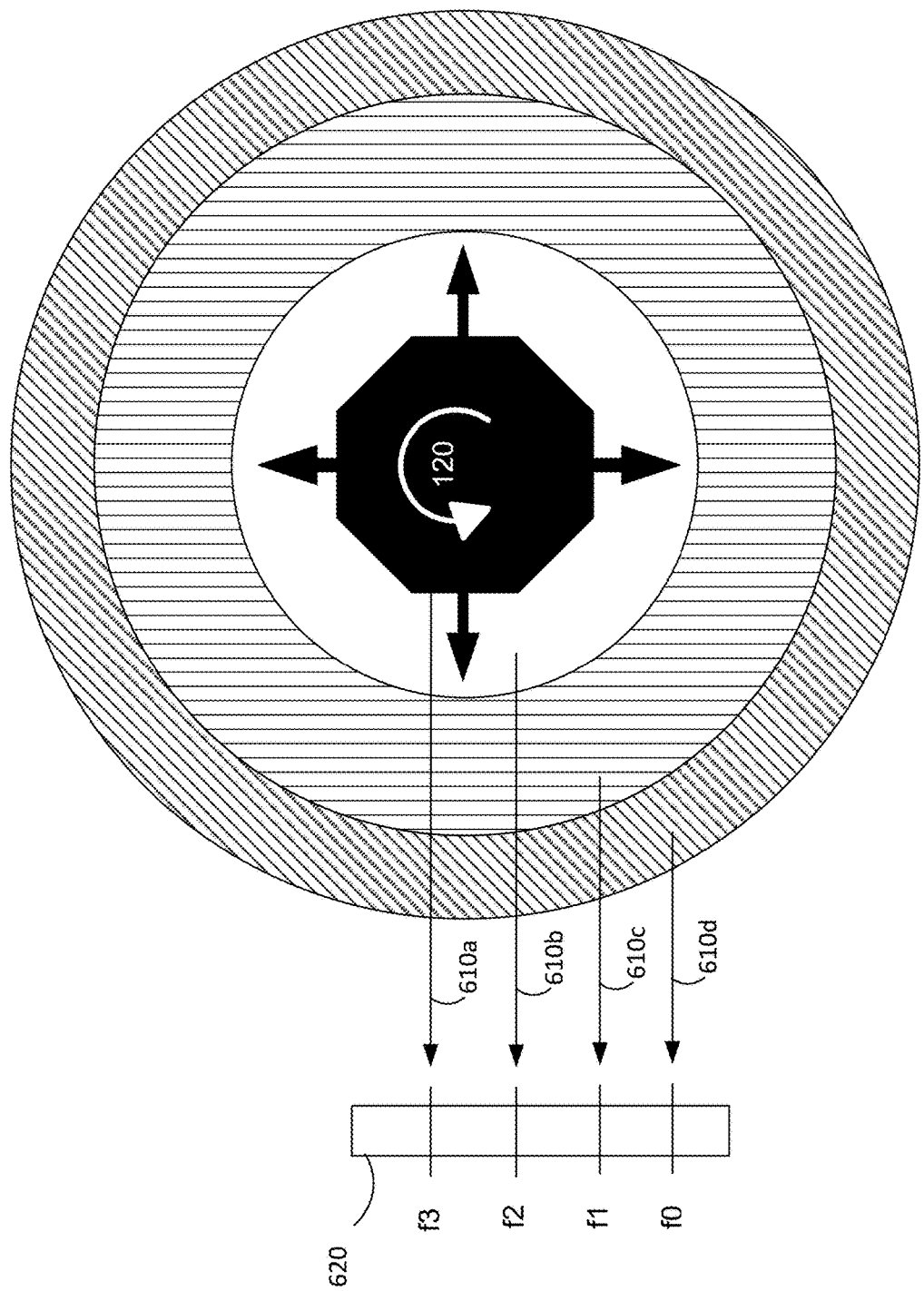
FIGS. 6A-6B illustrates different force sensing regions of the thumbstick and one or more haptic feedback triggers, in accordance with some embodiments.
Figure 6B:
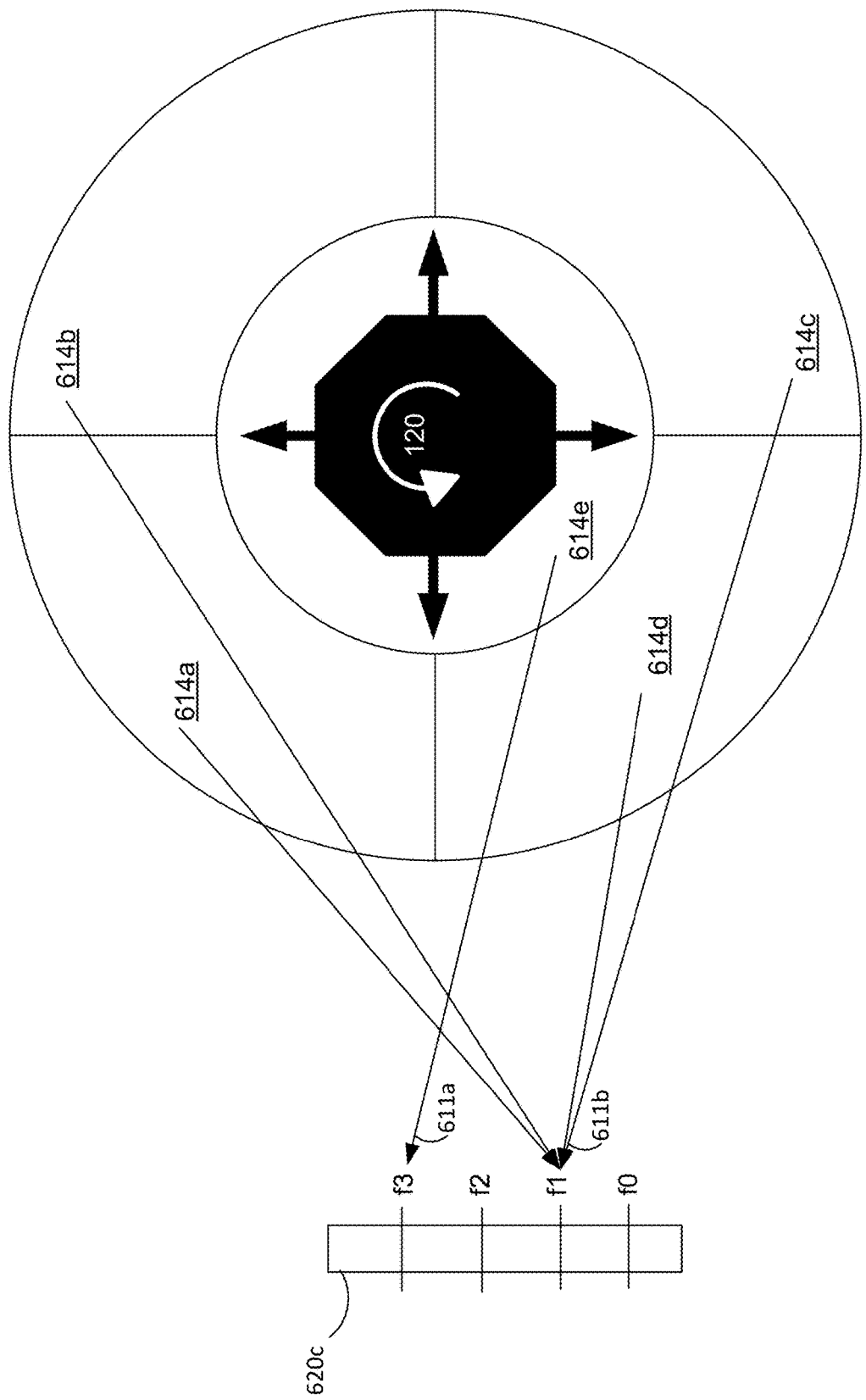

FIGS. 6A-6B illustrate different force sensing regions or zones of the thumbstick 120 and one or more haptic feedback triggers, in accordance with some embodiments. In some embodiments, predefined force values (e.g., a default-position predefined force value and one or more positionally-specific predefined force values) are associated with one or more ranges of positions 610a-610c of the thumbstick 120 relative to the top portion of the housing 110 (FIG. 1). FIGS. 6A-6B further show an alternative design for the top of the thumbstick 120 (e.g., an octagon shape) than the rounded/circular shape of the top of the thumbstick 120 shown in FIGS. 1-5C2. As described in FIG. 1, the thumbstick 120 is configured to move freely in two-dimensions. More specifically, the thumbstick 120 is configured to reach each position within the one or more ranges of positions 610a-610c.

In FIG. 6A, a default position 610a is at the center (e.g., stationary default position of the thumbstick 120) and is associated with a default-position predefined force value (represented by an f3 in a predetermined force value gauge 620, FIG. 6A), a first range of positions 610b includes a first distance from the thumbstick 120's stationary default position and is associated with a first positionally-specific predefined force value (represented by an f2 in the predetermine force value gauge 620), a second range of positions 610c includes a second distance from the thumbstick 120's stationary default position (e.g., a distance from the outer range of the first range of positions 610b to an inner range of a third range of positions 610d) and is associated with a second positionally-specific predefined force value (represented by an f1 in the predetermine force value gauge 620), and a third range of positions 610d includes a third distance from the thumbstick 120's stationary default position (e.g., a distance from the outer range of the second range of positions 610c to the outer range of the thumbstick 120's) and is associated with a third positionally-specific predefined force value (represented by an f0 in the predetermine force value gauge 620). In some embodiments, the one or more ranges of positions 610a-610d are not ranges, but are instead of specific positional values (e.g., x and y coordinates, such that more than force value values are used to determine whether to recognize force-based input events at each specific x and y coordinate position for the thumbstick).

As described above, positions and/or regions further from the stationary default position of the thumbstick 120 relative to the top portion of the housing 110 have lower predefined force values than positions and/or regions closer to the stationary default position of the thumbstick 120 relative to the top portion of the housing 110. Accordingly, the first range of positions 610b has a larger positionally-specific predefined force value (e.g., f2) than the second range of positions 610c, and the second range of positions 610c has a larger positionally-specific predefined force value (e.g., f1) than the third range of positions 610d (e.g., f0). The default position 610a being at the center has the largest lower predefined force value (f3).

In some embodiments, the first 610b, the second 610c, and the third 610d ranges of positions include one or more subsets of predefined force values (e.g., different intensity tiers). For example, the first range of positions 610b can include the first positionally-specific predefined force value f2 plus an additional predefined force value greater than the first positionally-specific predefined force value f2. In this way, additional haptic feedback can be provided to the user as they apply different forces to the thumbstick 120. This allows for an improved immersive experience as the controller is able to respond to the users input in real time. Additional detail on the haptic feedback events associated with the predefined force values is provide above in FIG. 1.

In some embodiments, each range of positions 610b-610d is the same size. Alternatively, in some embodiments, one or more ranges 610b-610d have distinct sizes. For example, each range can be approximately 2-3 mm. In another example, a first range of positions 610a can be 2 mm, a second range of positions 610b can be 3 mm, and a third range of positions 610c can be 4 mm. As indicted above, the skilled artisan in this field will appreciate upon reading this disclosure that that more than three ranges of positions 610a-610c (e.g., 4, 5, 6, etc.) can be used to more granularly associated the predefined force values with various positions of the thumbstick 120.

FIG. 6B illustrates alternative regions of thumbstick positions, as compared to those shown in FIG. 6A. In particular, FIG. 6B shows that one or more predefined force values can be associated with one or more zones 614a-614e (e.g., each respective quadrant shown in the thumbstick position plots of FIGS. 5A1-5C2). The different zones can be the same or different sizes (e.g., circular zone 614e and quarter zones 614a-614d). As an example, in FIG. 6B, the quarter zones 614a-614d are at the outer edges of the thumbstick 120's range and are therefore associated with a smaller predefined force value (e.g., f0). Alternatively, the circular zone 614e, being closer to the stationary default position of the thumbstick 120, is associated with a larger predefined force value (e.g., f0). FIG. 6B also shows that multiple zones can each be associated with a same positionally-specific predefined force value (as FIG. 6B shows, zones 614a-d each associated with the same positionally-specific predefined force value, f1; while zone 614e is associated with the default-position predefined force value, f3). User configuration options can allow users to determine how to associate the force values with various positions of the thumbstick, such that the system helps to produce an improved man-machine interface that meets user's expectations and is customized to their usage preferences. Similar to FIG. 6A, the skilled artisan in this field will appreciate upon reading this disclosure that that more than five zones can used to more granularly associated the predefined force values with various positions of the thumbstick 120 and that the size and the shape of each zone can be defined as needed.

Figure 7:
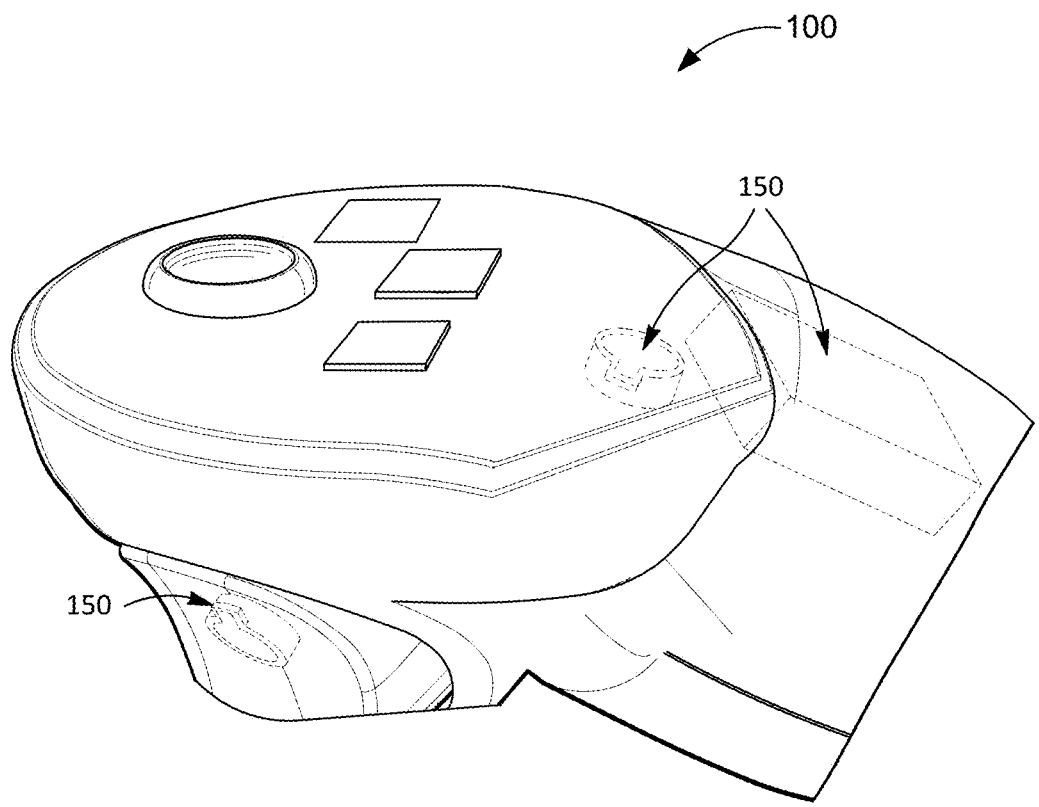
FIG. 7 illustrates another view of the controller with a force-sensing thumbstick and with one or more haptic-feedback generators, in accordance with some embodiments.

FIG. 7 illustrates the controller 100 with one or more haptic-feedback generators 150 positioned at different points within the housing 110, in accordance with some embodiments. In particular, FIG. 7 illustrates one or more positions of the haptic-feedback generators 150. By placing the haptic-feedback generators in different positions, the controller can then provide different types of haptic feedback responses as different force-based input events are recognized (as was discussed above in reference to FIGS. 5A1-5C2).

Figure 8:
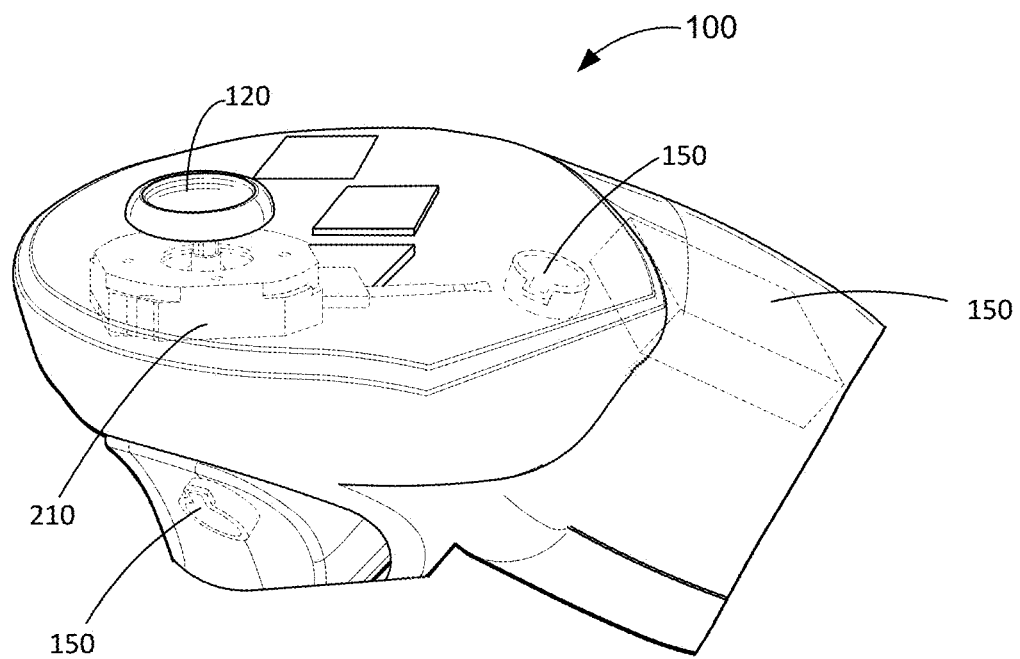
FIG. 8 illustrates an additional views of the controller including a control module for the force-sensing thumbstick, in accordance with some embodiments.

FIG. 8 illustrates another view of the controller 100 to depict a location of a control module 210 in addition to the haptic-feedback generators 150 within the controller's housing 110, in accordance with some embodiments.

Figure 9:
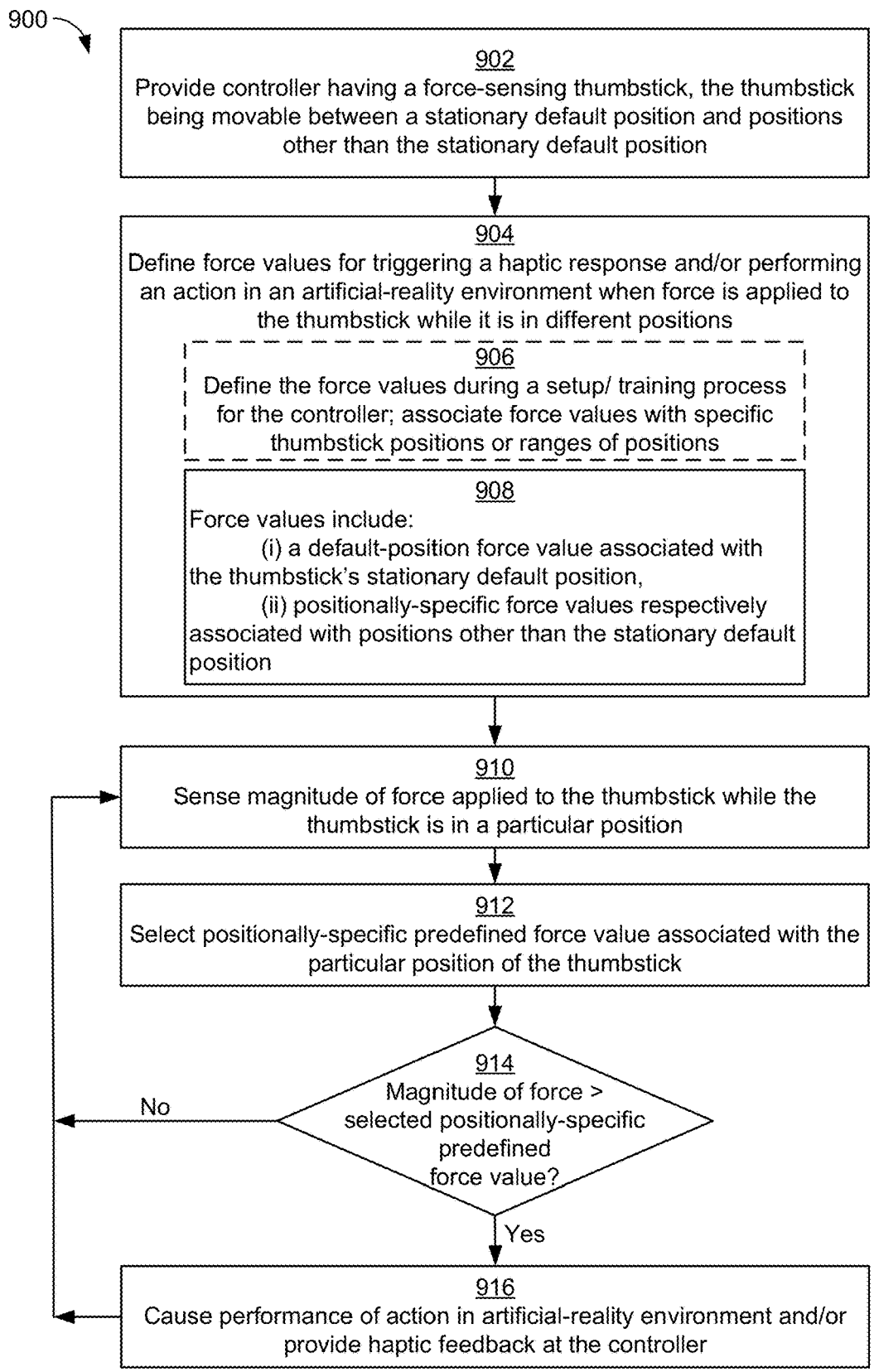
FIG. 9 is a flow diagram illustrating a method of using a controller with a force-sensing thumbstick, in accordance with some embodiments.

FIG. 9 is a flow diagram illustrating a method of using a controller 100 with a force-sensing thumbstick 120, in accordance with some embodiments. Operations (e.g., steps) of the method 900 may be performed by one or more processors 140 (FIG. 1) of a controller 100 including one or more force-sensing thumbsticks 120. At least some of the operations shown in FIG. 9 correspond to instructions stored in a computer memory or computer-readable storage medium (e.g., memory 142 of the controller 100, FIG. 1). Operations 904-916 can also be performed in part using one or more processors of a head-mounted display device (e.g., the head-mounted display device can perform operations 904, 912, 914, and/or 916 alone or in conjunction with the one or more processors of the controller 100).

At operation (902) the method 900 includes providing the controller 100 having a force-sensing thumbstick 120. As was mentioned above, two controllers 100 (each with its own force-sensing thumbstick 120) can also be provided, with each controller being held in one of the user's hands.

The force-sensing thumbstick 120 is configured to move between a stationary default position and positions other than the stationary default position. For example, as illustrated in FIGS. 5A1-6B, the force-sensing thumbstick 120 may have a full range of motion relative to a top portion of the housing of the controller 100.

The method 900 includes defining (904) force values for triggering a haptic response and/or performing an action in an artificial-reality environment when force is applied to the force-sensing thumbstick 120 while it is in different positions. In some embodiments, the method 900 includes defining (906) the force values during a setup/training process for the controller 100 and associating force values with specific force-sensing thumbstick 120 positions or ranges of positions. The method 900 includes force values including (908) (i) a default-position force value associated with the force-sensing thumbstick's 120 stationary default position, and (ii) positionally-specific force values respectively associated with positions other than the stationary default position. Examples of (i) the default-position force value associated with the force-sensing thumbstick's 120 stationary default position, and (ii) positionally-specific force values respectively associated with positions other than the stationary default position are provided above in reference to FIGS. 5A1-6B.

The method 900 includes sensing (910) magnitude of force applied to the force-sensing thumbstick 120 while the force-sensing thumbstick 120 is in a particular position. The method 900 further includes selecting (912) positionally-specific predefined force value associated with the particular position of the force-sensing thumbstick 120 and determining (914) whether a magnitude of a force is greater than the selected positionally-specific predefined force value. In accordance with a determination that the magnitude of the force is less than the selected positionally-specific predefined force value, the force-based input is not recognized (at that time) and no haptic feedback is provided to the user (nor is an action in response to recognition of the force-based input caused to be performed at a connected controllable device, such as a head-mounted display device). Further, in accordance with the determination that the magnitude of the force is less than the selected positionally-specific predefined force value, the method returns to operation (910) and continues to sense a magnitude of force applied to the force-sensing thumbstick 120 while the force-sensing thumbstick 120 is in a particular position.

In accordance with a determination that the magnitude of the force is greater than the selected positionally-specific predefined force value, the method 900 includes causing (916) performance of action in an artificial-reality environment and/or provide haptic feedback at the controller 100. For example, as discussed above in reference to FIGS. 5A1-5C2, the magnitude of the force satisfying a selected positionally-specific predefined force value will result in a haptic feedback event being provided to the user and/or performance of action in an artificial-reality environment. Further, after causing (916) performance of action in artificial-reality environment and/or provide haptic feedback at the controller 100, the method returns to operation (910) and senses a magnitude of force applied to the force-sensing thumbstick 120 while the force-sensing thumbstick 120 is in a particular position to allow for recognition of subsequent force-based inputs provided at the thumbstick 120.

Further embodiments also include various subsets of the above embodiments including embodiments in FIGS. 1-9 combined or otherwise re-arranged.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A system, comprising:
    a controller in electronic communication with an extended-reality device, including: one or more force sensors;
    one or more haptic feedback generators;
    a computing device, including:
        one or more processors; and
        memory, comprising instructions that, when executed by the one or more processors, cause the system to:
        detect:
            via one or more force sensors of the controller, an input that includes a magnitude of force being applied in a direction generally normal to a plane defined by a portion of a housing of the controller, and
            a position of the input relative to the plane defined by the portion of the housing;
        select, according to the position of the input, a first force sensing region from a plurality of force sensing regions, each force sensing region in the plurality of force sensing regions defined by a corresponding tilt angle range of a portion of the controller relative to the plane; and
        in accordance with a determination that the magnitude of force of the input and the position of the input satisfy a positionally-specific predefined force value assigned to the first force sensing region, cause a haptic feedback to be provided at the controller,
    wherein,
    the haptic feedback is selected from among a set of available haptic feedback events for the controller based on both the magnitude of force of the input, and the position of the input, and
    the haptic feedback is dynamically adjusted based on the force magnitude of the input and a position of a portion of the controller within the first force sensing region.

2. The system of claim 1, wherein:
    the controller includes a plurality of haptic feedback generators located at different positions within the housing of the controller, and
    a respective haptic feedback generator of the plurality of haptic feedback generators is selected to provide the haptic feedback based on both the magnitude of force of the input, and the position of the input.

3. The system of claim 1, wherein:
    the instructions for detecting the input include instructions for obtaining (i) torque force data and (ii) vector force data associated with the input, and
    the instructions for selecting the haptic feedback include instructions for determining the haptic feedback based on the torque force data, the vector force data, or both.

4. The system of claim 1, wherein the haptic feedback is provided to simulate an interaction with an artificial-reality (AR) object in an AR environment.

5. The system of claim 1, wherein the computing device is a component of the controller.

6. The system of claim 1, wherein the selected haptic feedback includes a plurality of different haptic feedback responses.

7. A method, comprising:
    at a computing device in electronic communication with a controller for an extended-reality device:
        detecting:
            via one or more force sensors of the controller, an input that includes a magnitude of force being applied in a direction normal to a plane defined by a portion of a housing of the controller, and
            a position of the input relative to the plane defined by the portion of the housing;
        selecting, according to the position of the input, a first force sensing region from a plurality of force sensing regions, each force sensing region in the plurality of force sensing regions defined by a corresponding tilt angle range of a portion of the controller relative to the plane; and
        in accordance with a determination that the magnitude of force of the input and the position of the input satisfy a positionally-specific predefined force value assigned to the first force sensing region, causing a haptic feedback to be provided at the controller,
    wherein,
    the haptic feedback is selected from among a set of available haptic feedback events for the controller based on both the magnitude of force of the input, and the position of the input, and
    the haptic feedback is dynamically adjusted based on the force magnitude of the input and a position of a portion of the controller within the first force sensing region.

8. The method of claim 7, wherein:
the controller includes a plurality of haptic feedback generators located at different positions within the housing of the controller, and
a respective haptic feedback generator of the plurality of haptic feedback generators is selected to provide the haptic feedback based on both the magnitude of force of the input, and the position of the input.

9. The method of claim 7, wherein:
detecting the input includes obtaining (i) torque force data and (ii) vector force data associated with the input, and
selecting the haptic feedback includes determining the haptic feedback based on the torque force data, the vector force data, or both.

10. The method of claim 7, wherein the haptic feedback is provided to simulate an interaction with an artificial-reality (AR) object in an AR environment.

11. The method of claim 7, wherein the computing device is a component of the controller.

12. The method of claim 7, wherein the selected haptic feedback includes a plurality of different haptic feedback responses.

13. A non-transitory computer-readable storage medium including instructions that, when executed by a computing device that is in electronic communication with a controller for an extended-reality device, cause the computing device to:
detect:
via one or more force sensors of the controller, an input that includes a magnitude of force being applied in a direction generally normal to a plane defined by a portion of a housing of the controller, and
a position of the input relative to the plane defined by the portion of the housing;
select, according to the position of the input, a first force sensing region from a plurality of force sensing regions, each force sensing region in the plurality of force sensing regions defined by a corresponding tilt angle range of a portion of the controller relative to the plane; and
in accordance with a determination that the magnitude of force of the input and the position of the input satisfy a positionally-specific predefined force value assigned to the first force sensing region, cause a haptic feedback to be provided at the controller,
wherein,
the haptic feedback is selected from among a set of available haptic feedback events for the controller based on both the magnitude of force of the input, and the position of the input, and
the haptic feedback is dynamically adjusted based on the force magnitude of the input and a position of a portion of the controller within the first force sensing region.

14. The non-transitory computer-readable storage medium of claim 13, wherein:
the controller includes a plurality of haptic feedback generators located at different positions within the housing of the controller, and
a respective haptic feedback generator of the plurality of haptic feedback generators is selected to provide the haptic feedback based on both the magnitude of force of the input, and the position of the input.

15. The non-transitory computer-readable storage medium of claim 13, wherein:
the instructions for detecting the input include instructions for obtaining (i) torque force data and (ii) vector force data associated with the input, and
the instructions for selecting the haptic feedback include instructions for determining the haptic feedback based on the torque force data, the vector force data, or both.

16. The non-transitory computer-readable storage medium of claim 13, wherein the haptic feedback is provided to simulate an interaction with an artificial-reality (AR) object in an AR environment.

17. The non-transitory computer-readable storage medium of claim 13, wherein the computing device is a component of the controller.

18. The non-transitory computer-readable storage medium of claim 13, wherein the selected haptic feedback includes a plurality of different haptic feedback responses.

* * * * *